(12) United States Patent
Hirohata et al.

(10) Patent No.: US 8,941,864 B2
(45) Date of Patent: Jan. 27, 2015

(54) IMAGE PROCESSING APPARATUS, IMAGE READING APPARATUS, IMAGE FORMING APPARATUS, AND IMAGE PROCESSING METHOD

(75) Inventors: Hitoshi Hirohata, Osaka (JP); Akihito Yoshida, Osaka (JP); Atsuhisa Morimoto, Osaka (JP); Yohsuke Konishi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 199 days.

(21) Appl. No.: 13/292,194

(22) Filed: Nov. 9, 2011

(65) Prior Publication Data
US 2012/0120444 A1    May 17, 2012

(30) Foreign Application Priority Data

Nov. 12, 2010   (JP) ................................. 2010-253878

(51) Int. Cl.
| | |
|---|---|
| *G06K 9/34* | (2006.01) |
| *G06K 9/32* | (2006.01) |
| *G06K 9/03* | (2006.01) |
| *H04N 7/01* | (2006.01) |
| *H04N 7/18* | (2006.01) |
| *H04N 1/40* | (2006.01) |
| *G06K 9/00* | (2006.01) |
| *G06K 9/42* | (2006.01) |
| *H04N 1/387* | (2006.01) |
| *H04N 1/00* | (2006.01) |
| *H04N 1/12* | (2006.01) |

(52) U.S. Cl.
CPC ........ *H04N 1/40062* (2013.01); *G06K 9/00449* (2013.01); *G06K 9/42* (2013.01); *H04N 1/3878* (2013.01); *H04N 1/00416* (2013.01); *H04N 1/12* (2013.01)
USPC ........ 358/1.15; 358/1.16; 358/451; 358/1.17; 358/449; 358/497; 382/177; 382/301; 382/318; 382/298; 348/443; 348/135

(58) Field of Classification Search
USPC ......... 358/1.16, 1.17, 1.9; 382/298, 229, 177, 382/199; 348/135
See application file for complete search history.

(56) References Cited

U.S. PATENT DOCUMENTS

| | | | | | |
|---|---|---|---|---|---|
| 4,977,602 | A | * | 12/1990 | Beato ............................ | 382/298 |
| 5,148,295 | A | * | 9/1992 | Matsubara .................... | 358/451 |
| 5,563,403 | A | | 10/1996 | Bessho et al. | |
| 5,566,252 | A | * | 10/1996 | Miyaza ......................... | 382/298 |
| 5,715,336 | A | * | 2/1998 | Tanaka .......................... | 382/301 |
| 5,751,921 | A | * | 5/1998 | Fujimoto ....................... | 358/1.9 |

(Continued)

FOREIGN PATENT DOCUMENTS

| | | |
|---|---|---|
| JP | 04-174088 A | 6/1992 |
| JP | 6-189083 A | 7/1994 |

(Continued)

*Primary Examiner* — Akwasi M Sarpong
(74) *Attorney, Agent, or Firm* — Renner, Otto, Boisselle & Sklar, LLP

(57) ABSTRACT

Disclosed is an image processing apparatus which (i) determines whether or not characters to be subjected to a character recognition process in image data have a size larger than a predetermined size, (ii) in a case where the characters is determined as larger than the predetermined size, reduces at least a region including the characters so that the size of the characters fits within the predetermined size, and (iii) performs a character recognition process of the characters with use of the reduced image data.

12 Claims, 25 Drawing Sheets

(56) References Cited

U.S. PATENT DOCUMENTS

| | | | |
|---|---|---|---|
| 5,825,942 A * | 10/1998 | Miyaza | 382/298 |
| 5,896,470 A * | 4/1999 | Miyaza | 382/298 |
| 6,298,159 B1 * | 10/2001 | Tukagoshii et al. | 382/229 |
| 7,796,817 B2 * | 9/2010 | Hotta et al. | 382/181 |
| 8,059,895 B2 * | 11/2011 | Tamaru | 382/176 |
| 8,326,085 B2 * | 12/2012 | Yokoi | 382/289 |
| 8,358,875 B2 * | 1/2013 | Uehori | 382/298 |
| 8,452,095 B2 * | 5/2013 | Maekawa et al. | 382/176 |
| 8,467,085 B2 * | 6/2013 | Oota | 358/1.16 |
| 2009/0316996 A1 * | 12/2009 | Yokoi | 382/199 |

FOREIGN PATENT DOCUMENTS

| | | |
|---|---|---|
| JP | 6-231301 A | 8/1994 |
| JP | 7-192086 A | 7/1995 |
| JP | 08-194776 A | 7/1996 |
| JP | 2009-230471 A | 10/2009 |

\* cited by examiner

FIG. 6 (a)

T1 SCANNING | T2 LEDGER SHEET OCR | T3 LEDGER SHEET STORE

PLEASE SET READING CONDITIONS [READ DOCUMENT]

| OUTPUT FORMAT | PDF (OCR) ▶ |
| RESOLUTION | 300dpi ▶ |
| COLOR TYPE | COLORED ▶ |
| SKEW CORRECTION | PERFORMED ▶ |

OCR SETTINGS

| OCR LANGUAGE | JAPANESE ▶ |
| CHARACTER SIZE | LARGE ▶ |
| TOP-BOTTOM DIRECTION CORRECTION | PERFORMED ▶ |

FIG. 6 (b)

OUTPUT FORMAT ▶
- PDF
- PDF (OCR)
- TIFF
- JPEG

RESOLUTION ▶
- 300dpi
- 600dpi
- 400dpi
- 300dpi
- 200dpi
- 100dpi

COLOR TYPE ▶
- COLORED
- COLORED
- GRAY SCALE
- MONO 2

SKEW CORRECTION ▶
- PERFORMED
- PERFORMED
- NOT PERFORMED

CHARACTER SIZE ▶
- LARGE
- STANDARD
- LARGE
- VERY LARGE
- AUTO

OCR LANGUAGE ▶
- JAPANESE
- JAPANESE
- ENGLISH

TOP-BOTTOM DIRECTION CORRECTION ▶
- PERFORMED
- PERFORMED
- NOT PERFORMED

FIG. 11 (a)

| CHARACTER SIZE | REDUCTION RATIO |
|---|---|
| STANDARD | SAME SIZE |
| LARGE | 1/2 |
| VERY LARGE | 1/4 |

FIG. 11 (b)

| HEIGHT OF CHARACTER [NUMBER OF PIXELS] | REDUCTION RATIO |
|---|---|
| LESS THAN 200 | SAME SIZE |
| 200 TO LESS THAN 400 | 1/2 |
| 400 OR MORE | 1/4 |

FIG. 16

| DESCRIPTION | PREPARED QUANTITY | UNIT PRICE | TOTAL |
|---|---|---|---|
| | | | |
| | | | |
| | | | |
| | | | |
| | | | |
| | | | |
| | | | |
| | | | |
| | | | |
| | | | |

INVOICE  ○○○○CO., LTD.
DEPARTMENT

〒

DATE (MONTH) (DAY), (YEAR)

INVOICE NUMBER:
NAME:

SUBTOTAL
TAX
SUM TOTAL

LEDGER SHEET NO. 0010

| | INVOICE | | ○○○○CO., LTD.<br>DEPARTMENT | |
|---|---|---|---|---|
| | 〒 | | DATE | (MONTH) (DAY), (YEAR) |
| | | | INVOICE NUMBER | |
| | | | NAME | |

| DESCRIPTION | PREPARED QUANTITY | UNIT PRICE | TOTAL |
|---|---|---|---|
| | | | |
| | | | |
| | | | |
| | | | |
| | | | |
| | | | |
| | | | |
| | | | |
| | | | |
| | | | |
| | | | |
| | | SUBTOTAL | |
| | | TAX | |
| | | SUM TOTAL | |

LEDGER SHEET NO. 0010

FIG. 19 (a)

STARTING POINT

×
1-2-3, ○○-CHO,
○○-SHI, ○○
123-4567
○○○○ CO., LTD.
Mr. ○○○○

×
END POINT

FIG. 19 (b)

1-2-3, ○○-CHO,
○○-SHI, ○○
123-4567
○○○○ CO., LTD.
Mr. ○○○○

FIG. 20 (a)

DESIGNATED POINT

| NAME | × | ~a5 |

FIG. 20 (b)

| NAME | | ~a5 |

FIG. 21 (a)

| PLEASE SET OCR CONDITIONS | SET | CANCEL | CLEAR |

ITEM NO.: 3
ITEM NAME: ITEM 3
CHARACTER SIZE: STANDARD
NO. OF ROWS: PLURAL

CHARACTER TYPE
● JAPANESE
○ ENGLISH
○ NUMERALS
○ ALPHABETICAL LETTERS/SYMBOLS
○ KATAKANA

FIG. 21 (b)

| ITEM NO. | NO. OF ROWS | CHARACTER SIZE |
|---|---|---|
| 3 | PLURAL | STANDARD |
| 1 | ONE | STANDARD |
| 2 | PLURAL | LARGE |
| 3 | AUTO | VERY LARGE |
| 4 | | AUTO |
| 5 | | |
| 6 | | |

FIG. 21 (c)

| PLEASE SET OCR CONDITIONS | SET | CANCEL | CLEAR |

ITEM NO.: 1
ITEM NAME: NUMBER
CHARACTER SIZE: STANDARD
NO. OF ROWS: ONE

CHARACTER TYPE
○ JAPANESE
○ ENGLISH
● NUMERALS
● ALPHABETICAL LETTERS/SYMBOLS
○ KATAKANA

FIG. 21 (d)

| PLEASE SET OCR CONDITIONS | SET | CANCEL | CLEAR |

ITEM NO.: 2
ITEM NAME: ADDRESS
CHARACTER SIZE: STANDARD
NO. OF ROWS: PLURAL

CHARACTER TYPE
● JAPANESE
○ ENGLISH
○ NUMERALS
○ ALPHABETICAL LETTERS/SYMBOLS
○ KATAKANA

FIG. 21 (e)

| PLEASE SET OCR CONDITIONS | SET | CANCEL | CLEAR |

ITEM NO.: 
ITEM NAME: 
CHARACTER SIZE: STANDARD
NO. OF ROWS: PLURAL

CHARACTER TYPE
● JAPANESE
○ ENGLISH
○ NUMERALS
○ ALPHABETICAL LETTERS/SYMBOLS
○ KATAKANA

FIG. 22

| LEDGER SHEET COMMON | LEDGER SHEET NO. | 1 |
| --- | --- | --- |
| | LEDGER SHEET NAME | LEDGER SHEET 1 |
| | LEDGER SHEET TYPE | LEDGER SHEET No. 0010 |
| | READING RESOLUTION | 300dpi |
| | DOCUMENT SKEW CORRECTION | PERFORM |
| | TOP-BOTTOM DIRECTION CORRECTION | PERFORM |
| | NO. OF ITEMS | 10 |

| ITEM 1 | | ITEM NO. | 1 |
| --- | --- | --- | --- |
| | | ITEM NAME | ITEM 1 |
| | | CHARACTER SIZE | LARGE |
| | | LINAGE | ONE |
| | CHARACTER TYPE | JAPANESE | YES |
| | | ENGLISH | NO |
| | | NUMERALS | NO |
| | | ALPHABETICAL LETTERS/SYMBOLS | NO |
| | | KATAKANA | NO |
| | AREA | UPPER-LEFT X COORDINATE | 1000 |
| | | UPPER-LEFT Y COORDINATE | 2000 |
| | | WIDTH | 200 |
| | | HEIGHT | 100 |

| ITEM 2 | | ITEM NO. | 2 |
| --- | --- | --- | --- |
| | | ITEM NAME | ITEM 2 |
| | | CHARACTER SIZE | STANDARD |
| | | LINAGE | ONE |
| | CHARACTER TYPE | JAPANESE | NO |
| | | ENGLISH | NO |
| | | NUMERALS | YES |
| | | ALPHABETICAL LETTERS/SYMBOLS | YES |
| | | KATAKANA | NO |
| | AREA | UPPER-LEFT X COORDINATE | 1000 |
| | | UPPER-LEFT Y COORDINATE | 2400 |
| | | WIDTH | 100 |
| | | HEIGHT | 30 |

INVOICE

1-2-3, OO-CHO,
OO-SHI, OO
123-4567
OOOO CO., LTD.
Mr. OOOO

OOOOCO., LTD.
FIRST SALES DEPARTMENT

DATE OCTOBER 10, 2010

| INVOICE NUMBER | A-12345-1 |
|---|---|
| NAME | TARO HAYAKAWA |

| DESCRIPTION | PREPARED QUANTITY | UNIT PRICE | TOTAL |
|---|---|---|---|
| △△△△ | 1 | 2000 | 2000 |
| ×××× | 2 | 1500 | 3000 |
|  |  |  |  |
|  |  |  |  |
|  |  |  |  |
|  |  |  |  |
|  |  |  |  |
|  |  |  |  |
|  |  | SUBTOTAL | 5000 |
|  |  | TAX | 250 |
|  |  | SUM TOTAL | 5250 |

LEDGER SHEET NO. 0010

FIG. 24 (b)

1-2-3, OO-CHO,
OO-SHI, OO
123-4567
OOOO CO., LTD.
Mr. OOOO

OOOOCO., LTD.
FIRST SALES DEPARTMENT

OCTOBER 10, 2010

A-12345-1

TARO HAYAKAWA

△△△△

1

2000

2000

...

IMAGE PROCESSING APPARATUS, IMAGE READING APPARATUS, IMAGE FORMING APPARATUS, AND IMAGE PROCESSING METHOD

This Nonprovisional application claims priority under 35 U.S.C. §119(a) on Patent Application No. 2010-253878 filed in Japan on Nov. 12, 2010, the entire contents of which are hereby incorporated by reference.

TECHNICAL FIELD

The present invention relates to an image processing apparatus and an image processing method, each of which performs a character recognition process of characters on a document, which character recognition process is performed based on document image data that is obtained by reading the document.

BACKGROUND ART

A conventional technique is available for creating text data in the following method: (1) read information provided on a paper medium with a scanner to create image data; and (2) perform a character recognition process (OCR (Optical Character Recognition) process) to characters included in the image data.

For instance, Patent Literature 1 discloses a technique which uses an image read with (i) photoelectric conversion means of a high resolution having a high number of pixels and (ii) photoelectric conversion means of a low resolution having a low number of pixels. This allows for reading small characters with high accuracy while reading large characters in high speed. In performing the character recognition in Patent Literature 1, image data obtained by reading with the photoelectric conversion means of the high resolution is used in a case where the characters are small, whereas image data obtained by reading with the photoelectric conversion means of the low resolution is used in a case where the characters are large.

CITATION LIST

Patent Literature

Patent Literature 1
Japanese Patent Application Publication, Tokukaihei, No. 6-231301 A (Publication Date: Aug. 19, 1994)
Patent Literature 2
Japanese Patent Application Publication, Tokukaihei, No. 7-192086 A (Publication Date: Jul. 28, 1995)
Patent Literature 3
Japanese Patent Application Publication, Tokukaihei, No. 6-189083 A (Publication Date: Jul. 8, 1994)

SUMMARY OF INVENTION

Technical Problem

However, the technique of Patent Literature 1 requires providing a plurality of photoelectric conversion means. This causes the configuration of the apparatus to be complicated and further causes an increase in apparatus costs.

The present invention is accomplished in view of the problems, and its object is to allow for accurately performing a character recognition process for characters of various character sizes while having a simple configuration.

Solution to Problem

In order to attain the object, an image processing apparatus of the present invention is an image processing apparatus performing a character recognition process of characters written on a document, the character recognition process being performed based on image data obtained by reading the document, the image processing apparatus including: a character size determination section configured to determine to which one of size ranges a character size of the characters in the image data to be subjected to the character recognition process belongs, the size ranges including a standard size range not more than a predetermined size and a plurality of size ranges larger than the predetermined size; a reduction processing section configured to, in a case where the character size determination section determines that the character size of the characters to be subjected to the character recognition process in the image data belongs to one of the plurality of size ranges larger than the predetermined size, reduce a region at least including the characters determined as belonging to the size range larger than the predetermined size, so that the character size becomes not more than the predetermined size, the character size being reduced by use of a reduction ratio corresponding to the character size of the determined size range, each of the size ranges being set in advance with a reduction ratio used for reducing the character size of the characters belonging to the respective size range; and a recognition processing section configured to perform the character recognition process of the characters included in the image data, in the case where the character size determination section determines that the character size of the characters to be subjected to the character recognition process in the image data belongs to one of the plurality of size ranges larger than the predetermined size, the recognition processing section performing the character recognition process with use of the image data in which the region including the characters determined as belonging to one of the plurality of size ranges larger than the predetermined size is reduced by the reduction processing section.

In order to attain the object, an image processing method of the present invention is a method of performing a character recognition process of characters written on a document, the character recognition process being performed based on image data obtained by reading the document, the method including the steps of: (i) determining to which one of size ranges a character size of the characters in the image data to be subjected to the character recognition process belongs, the size ranges including a standard size range not more than a predetermined size and a plurality of size ranges larger than the predetermined size; (ii) in a case where it is determined in the step (i) that the character size of the characters to be subjected to the character recognition process in the image data belongs to one of the plurality of size ranges larger than the predetermined size, reducing a region at least including the characters determined as belonging to a size range larger than the predetermined size, so that the character size becomes not more than the predetermined size, the character size being reduced by use of a reduction ratio corresponding to the character size of the determined size range, each of the size ranges being set in advance with a reduction ratio used for reducing the character size of the characters belonging to the respective size range; and (iii) performing a character recognition process of the characters included in the image data; in the case where the character size of the characters to be subjected to the character recognition process in the image data is determined in the step (i) as belonging to one of the plurality of size ranges larger than the predetermined size, the character recognition process being performed with use of the image data in which the region including the characters determined as belonging to one of the plurality of size ranges larger than the predetermined size is reduced in the step (ii).

Advantageous Effects of Invention

According to the image processing apparatus and the image processing method of the present invention, characters in the image data which are to be subjected to the character recognition process are determined as to which size range a character size of the characters belongs, which size ranges include a standard size range not more than a predetermined size and a plurality of size ranges larger than the predetermined size; in a case where it is determined that the characters belong to one of the plurality of size ranges larger than the predetermined size, the image processing apparatus and the image processing method perform a reducing process to a region at least including the characters determined as belonging to a size range larger than the predetermined size, so that the character size becomes not more than the predetermined size, the character size being reduced by use of a reduction ratio corresponding to the character size of the determined size range, each of the size ranges being set in advance with a reduction ratio used for reducing the character size of the characters belonging to the respective size range, and performs the character recognition process of the characters by use of the image data which has been subjected to the reducing process. This allows for carrying out the character recognition process with good accuracy even if the character recognition process is performed to characters having a character size larger than the predetermined size. Namely, it is possible to perform the character recognition process for characters of various character sizes with a simple configuration. Moreover, the reduction process is performed with use of a reduction ratio set beforehand. Hence, there is no need to calculate the reduction ratio in accordance with the size of the character. This makes it possible to perform the reducing process in a simple manner.

BRIEF DESCRIPTION OF DRAWINGS

FIG. 6(a) is a view illustrating an example of a display screen displayed on an operation panel of the image forming apparatus illustrated in FIG. 2 and FIG. 3.

FIG. 6(b) is a view illustrating the options selectable by a user in the display screen illustrated in FIG. 6(a).

FIG. 11(a) is a view illustrating a method of setting a reduction ratio in a reduction process performed by a reduction processing section provided in the document detection section illustrated in FIG. 5.

FIG. 11(b) is a view describing a method of setting a reduction ratio in a reduction process performed by a reduction processing section provided in the document detection section illustrated in FIG. 5.

FIG. 16 is a view describing an example of a ledger sheet document newly stored in a process of the ledger sheet store mode illustrated in FIG. 15.

FIG. 17(a) is a view illustrating an example of a display screen displayed based on a reading result of the ledger sheet document illustrated in FIG. 16.

FIG. 17(b) is a view describing an example of a display screen displayed based on a reading result of the ledger sheet document illustrated in FIG. 16.

FIG. 17(c) is a view describing an example of a display screen displayed based on a reading result of the ledger sheet document illustrated in FIG. 16.

FIG. 17(d) is a view describing an example of a display screen displayed based on a reading result of the ledger sheet document illustrated in FIG. 16.

FIG. 17(e) is a view illustrating an example of a display screen displayed based on a reading result of the ledger sheet document illustrated in FIG. 16.

FIG. 18 is a view describing an example of a region set as an OCR region in the ledger sheet document illustrated in FIG. 16.

FIG. 19(a) is a view illustrating a method of setting an OCR region in the process of the ledger sheet store mode illustrated in FIG. 15.

FIG. 19(b) is a view describing a method of setting an OCR region in the process of the ledger sheet store mode illustrated in FIG. 15.

FIG. 20(a) is a view describing a method of setting an OCR region in the process of the ledger sheet store mode illustrated in FIG. 15.

FIG. 20(b) is a view describing a method of setting an OCR region in the process of the ledger sheet store mode illustrated in FIG. 15.

FIG. 21(a) is a view describing an example of an OCR condition setting window displayed on a display section of an operation panel at a time when an OCR condition is to be set in the process of the ledger sheet store mode illustrated in FIG. 15.

FIG. 21(b) shows conditions selectable by a user for each of the selectable items on an OCR condition setting screen.

FIG. 21(c) is a view describing an example of an OCR condition setting window displayed on a display section of an operation panel at a time when an OCR condition is to be set in the process of the ledger sheet store mode illustrated in FIG. 15.

FIG. 21(d) is a view describing an example of an OCR condition setting window displayed on a display section of an operation panel at a time when an OCR condition is to be set in the process of the ledger sheet store mode illustrated in FIG. 15.

FIG. 21(e) is a view describing an example of an OCR condition setting window displayed on a display section of an operation panel at a time when an OCR condition is to be set in the process of the ledger sheet store mode illustrated in FIG. 15.

FIG. 22 is a view illustrating an example of registration information of a ledger sheet to be stored in the ledger sheet store mode illustrated in FIG. 15.

FIG. 24(a) is a view illustrating an example of a ledger sheet document to be subjected to processing in a process of the ledger sheet OCR mode illustrated in FIG. 23.

FIG. 24(b) is a view illustrating an example of text data detected by the character recognition process from image data of the ledger sheet document illustrated in FIG. 24(a).

DESCRIPTION OF EMBODIMENTS

One embodiment of the present invention is described below. The present embodiment mainly describes an example in a case where the present invention is applied to a digital color multifunction peripheral (a multifunction peripheral including functions such as a copier function, a scanner function, a printer function, a facsimile transmission and reception function, and a scan to e-mail function).

(1-1. Entire Configuration of Digital Color Multifunction Peripheral 1)

Figure 2:
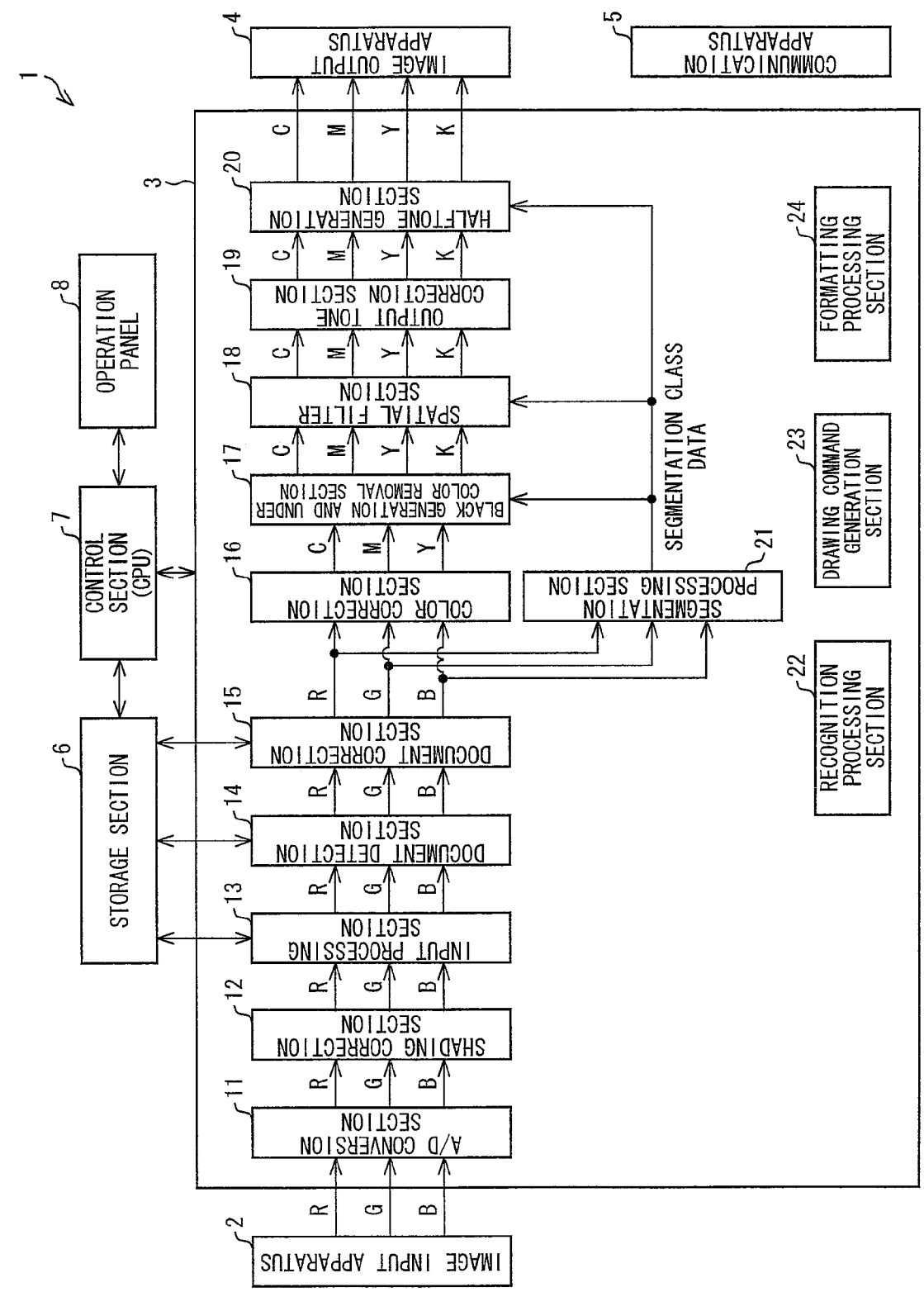
FIG. 2 is a block diagram illustrating a configuration of an image forming apparatus which includes an image processing apparatus according to one embodiment of the present invention.
Figure 3:
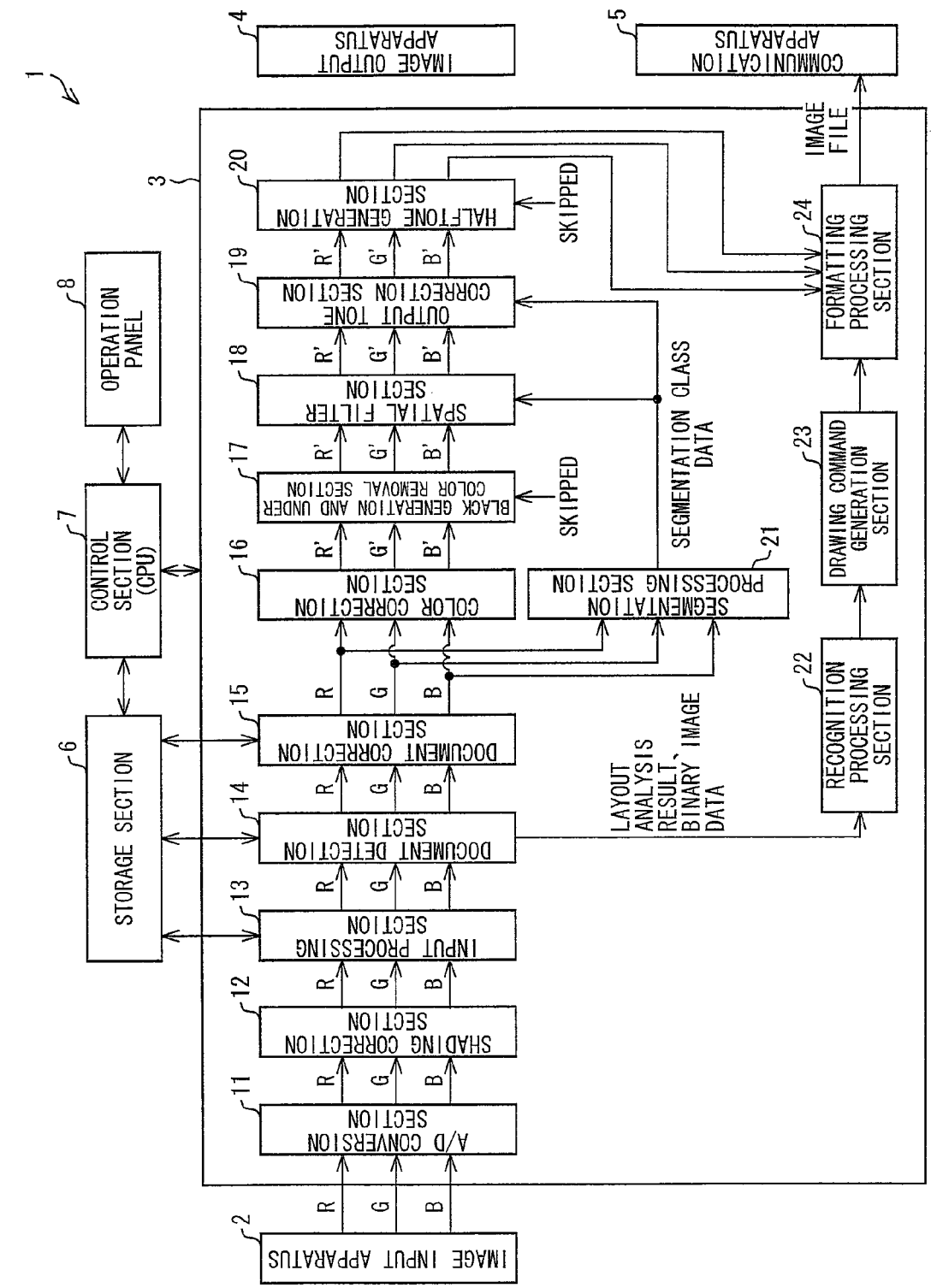
FIG. 3 is a block diagram illustrating a configuration of an image forming apparatus including an image processing apparatus according to an embodiment of the present invention.

Each of FIG. 2 and FIG. 3 is a block diagram illustrating an overall configuration of a digital color multifunction peripheral (image reading apparatus, image forming apparatus) 1 including an image processing apparatus according to the present embodiment. As illustrated in FIG. 2 and FIG. 3, the digital color multifunction peripheral 1 includes an image input apparatus 2, an image processing apparatus 3, an image output apparatus 4, a communication apparatus 5, a storage section 6, a control section 7, and an operation panel 8.

The digital color multifunction peripheral 1 has two modes: (1) an image forming mode for forming (printing), on recording material by the image output apparatus 4, an image corresponding to image data read by the image input apparatus 2 or image data received from outside via the communication apparatus 5; and (2) an image transmission mode for transmitting image data read by the image input apparatus 2 to an external apparatus via the communication apparatus 5. Moreover, the image transmission mode has a scanning mode (regular reading mode), a ledger sheet OCR mode, and a ledger sheet store mode. Furthermore, in the scanning mode, it is possible to select whether or not to perform a character recognition process (OCR process) of a document based on the image data obtained by reading the document. FIG. 2 illustrates an example of the flow of data in the image forming mode, and FIG. 3 illustrates an example of the flow of data in the image transmission mode. The image data received from outside via the communication apparatus 5 is temporarily stored in the storage section 6, and is thereafter read out from the storage section 6 to output the image data upon receiving instructions from the user.

The image input apparatus 2 creates image data (document image data) by reading an image of a document. For example, the image input apparatus 2 is configured of a scanner section including a device (photoelectric conversion means) which converts optical information into an electric signal, such as a CCD (Charge Coupled Device) line sensor. In the present embodiment, the image input apparatus 2 outputs a reflected light image from the document to the image processing apparatus 3 as an analog signal of RGB (R: red, G: green, B: blue). The image input apparatus 2 is described in detail later.

In the image forming mode, the image processing apparatus 3 performs various image processings to the image data received from the image input apparatus 2, whereby obtaining image data of CMYK. Thereafter, the obtained image data of CMYK is outputted to the image output apparatus 4. Moreover, in the image transmission mode, the image processing apparatus 3 performs various image processings to the image data received from the image input apparatus 2, creates an image file (output file) in a file format designated by a user, and outputs this image file to the communication apparatus 5. Meanwhile, if the execution of the character recognition process is designated, the image processing apparatus 3 creates (a) an image file in which the image data is associated with a result of the character recognition process or (b) a file (output file) including text data created in accordance with the result of the character recognition process, and outputs the created data to the communication apparatus 5. The image processing apparatus 3 is described in detail later.

The image output apparatus (image output section) 4 outputs the image data received from the image processing apparatus 3 on recording material (e.g. paper). The image output apparatus 4 is not particularly limited in its configuration, and for instance, an image output apparatus of an electrophotographic printing system or that of an inkjet printing system may be used.

The communication apparatus 5 is configured of, for example, a modem or a network card. The communication apparatus 5 carries out data communication with other apparatuses (e.g. personal computer, server apparatus, display apparatus, other digital multifunctional peripherals, facsimile apparatus) that are connected to the network via a network card, LAN cable or the like.

The operation panel 8 is configured of a display section such as a liquid crystal display and an operation input section such as setting buttons (both not illustrated). The operation panel 8 displays on the display section information according to instructions from the control section 7 and sends information entered by the user from the setting buttons to the control section 7. As the operation panel 8, a touch panel in which a display section and the operation input section are integrated as one may be used. The user can enter various information from the operation panel 8, such as a processing mode for the inputted image data, the number of copies, a sheet size, and a transmission destination address.

The storage section 6 is storage means for storing various data (e.g. image data, storage information of ledger sheets) that is processed by the image processing apparatus 3. The storage section 6 is not particularly limited in its configuration; for example, a hard disk may be used as the storage section 6.

The control section 7 is configured of for example a CPU (Central Processing Unit) or the like, and controls operations of each of sections of the digital color multifunction peripheral 1 based on (a) programs and various data stored in a ROM or the like (not illustrated), (b) information inputted from the operation panel 8, (c) detection results of various sensors provided in the image input apparatus 2 or image output apparatus 4, and the like.

(1-2. Configuration of Image Input Apparatus 2)

Figure 4:
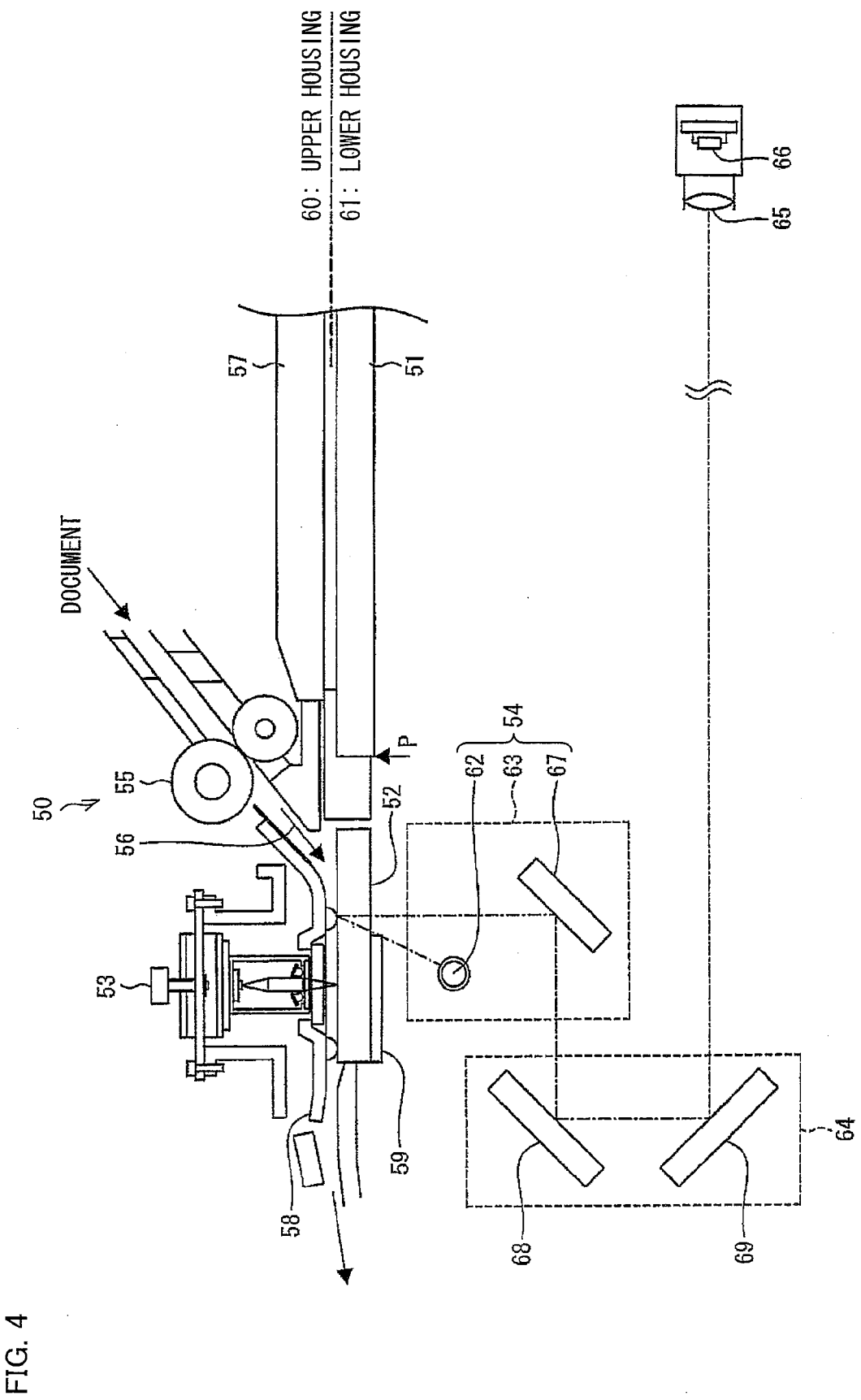
FIG. 4 is a view illustrating a configuration of an image input apparatus provided in the image forming apparatus illustrated in FIG. 2.

FIG. 4 is a view illustrating a configuration of the image input apparatus 2. As illustrated in FIG. 4, the image input apparatus 2 includes an image sensing section 53 which reads an image on an upper surface of a document conveyed on the second contact glass 52, and a reading section 54 having a function for reading an image on a lower surface of the document conveyed on the second contact glass 52 and having a function for reading a lower surface of the document by reading the document placed on the first contact glass 51. Hence, the image input apparatus 2 can carry out a static-sheet reading mode which reads an image of a static document, while also is capable of carrying out a sheet-feed reading mode which reads a document while the document is being conveyed. Moreover, the sheet-feed reading mode can perform a one-side (single-side) reading mode which reads an image on one side of the conveyed document and further can perform a double side reading mode which reads images on either side of the conveyed document.

The image input apparatus 2 includes an ADF (Auto Document Feeder) 50 to convey the document so that it moves along the second contact glass 52. The ADF 50 includes an alignment roller pair 55, as illustrated in FIG. 4. The alignment roller pair 55 is disposed so that an edge of the conveyed document runs into a nip section of the alignment roller pair 55. After a predetermined bend is formed to the document by the document running to the nip section, the alignment roller pair 55 rotates to convey the document to a document conveying path 56 provided downstream of the alignment roller pair 55. This aligns the direction of the document so that the edge of the document is made perpendicular to the conveying direction.

Moreover, the ADF 50 has a document pressing mat 57 which faces the first contact glass 51 and holds down the document placed on the first contact glass 51. Further, the ADF 50 has a guide 58 provided on a side facing the second contact glass 52 to control the conveying direction of the document. Furthermore, on a side of the second contact glass 52 opposite of the side facing the image sensing section 53, a light shielding member 59 is disposed to prevent light being emitted from the light source 62 of the reading section 54 to be incident on the image sensing section 53 and cause the image sensing section 53 to not be able to scan an image with an appropriate density.

From among the aforementioned members, the members such as the document pressing mat 57, the alignment roller pair 55, the document conveying path 56, the image sensing section 53, and the upper document conveying guide 58 are provided in an upper housing (platen cover) 60, whereas the first contact glass 51, the second contact glass 52, and the reading section 54 are provided in a lower housing 61. Moreover, the upper housing 60 is configured so that the upper housing 60 can be opened up from and closed down to the lower housing 61.

The reading section 54 includes a first scanning unit 63, a second scanning unit 64, an imaging lens 65, and a CCD (Charge Coupled Device) 66. The first scanning unit 63 exposes a document to light and moves at a constant velocity V along the first contact glass 51 (from left to right in FIG. 4). The first scanning unit 63 includes a light source (exposure lamp) 62, and a first reflection mirror 67 that guides reflection light of the document to the second scanning unit 64.

The second scanning unit 64 moves at a speed of V/2 following the first scanning unit 63, and includes a second reflection mirror 68 and a third reflection mirror 69, each of which for guiding the light reflected from the first reflection mirror 67 to the imaging lens 65.

The imaging lens 65 forms an image on the CCD 66 with the reflection light reflected from the third reflection mirror 69. The CCD 66 converts the light from the imaging lens 65 into analog electric signals. The analog electric signals are then converted into digital image data by the image processing apparatus 3 later described.

In a case where a document is to be read by the sheet-feed reading mode (one-side (single-side) reading mode, double side reading mode), the reading section 54 moves from a home position (not illustrated) to a position facing the second contact glass 52, as illustrated in FIG. 4. Alternatively, in a case where a document is read in the static-sheet reading mode, the reading section 54 moves in a direction along the first contact glass 51 from a position P illustrated in FIG. 4, just by a distance in accordance with a document size detected by the document size detection means (not illustrated). The document size detection means may be means which detects, for example, a document size in a main scanning direction and a sub-scanning direction of a document placed on the first contact glass 51 by a photodetector such as a phototransistor disposed inside the image input apparatus 2, or alternatively, may be means which detects a document size selected by a user from the operation panel 8.

In a case where the document is read in the double side reading mode, for example if it is set that a front side of the document is to be read by the reading section 54, at first image data obtained by reading with the reading section 54 is outputted to the image processing apparatus 3, and thereafter image data of a back side of the document obtained by reading with the image sensing section 53 is inputted into the image processing apparatus 3. While the image data obtained by reading with the reading section 54 is processed by the image processing apparatus 3, the image data obtained by reading with the image sensing section 53 is stored in a storage section 6 later described. After the image processing of the image data obtained by reading with the reading section 54 is completed (or in accordance with a progressing state of the image processing to the image data read by the reading section 54), the image data obtained by reading with the image sensing section 53 is read out from the storage section 6 to perform image processing thereto.

The configuration of the image input apparatus 2 is not limited to this configuration, and may be any configuration as long as a document can be read to create image data. For example, the image input apparatus 2 may just have one of either the function to read a document placed on a platen or the function to read a conveyed document.

(1-3. Configuration of Image Processing Apparatus 3 and Operation of Image Forming Mode)

Next describes the configuration and operation of the image processing apparatus 3. First described are operations performed in the image forming mode.

As illustrated in FIG. 2, the image processing apparatus 3 includes an A/D conversion section 11, a shading correction section 12, an input processing section 13, a document detection section 14, a document correction section 15, a color correction section 16, a black generation and under color removal section 17, a spatial filter section 18, an output tone correction section 19, a halftone generation section 20, a segmentation processing section 21, a recognition processing section 22, a drawing command generation section 23, and a formatting processing section 24.

In a case of the image forming mode, the A/D conversion section 11 first converts an RGB analog signal inputted from the image input apparatus 2 to a digital signal, and outputs this digital signal to the shading correction section 12.

The shading correction section 12 performs processes to the digital RGB signal received from the A/D conversion section 11 to remove various distortions caused by an illumination system, image focusing system, image sensing system of the image input apparatus 2, and outputs the processed RGB signal to the input processing section 13.

The input processing section (input tone correction section) 13 adjusts color balance of the RGB signal from which the various distortions have been removed by the shading correction section 12, while simultaneously converting the RGB signal to a signal that can be easily treated by the image processing apparatus 3, such as a density signal. Moreover, image quality adjusting processes such as removal of background density and contrast are performed. Moreover, the input processing section 13 temporarily stores in the storage section 6 the image data to which the foregoing processes are performed.

Based on the image data to which the foregoing processes have been performed by the input processing section 13, the document detection section 14 detects a skewed angle, a top-bottom (top-to-bottom) direction, an image region in which an image is present in the image data and the like of the document image, and outputs the detection result to the document correction section 15.

Based on the detection result of the document detection section 14 (skew detection result by the document skew detection section 34 and top-bottom direction detection result by the top-bottom direction detection section 35), the document correction section 15 performs a document skew correction process and a top-bottom direction correction process to the image data to which the foregoing processes have been performed by the input processing section 13.

In the present embodiment, the document correction section 15 performs the document skew correction process based on the skew detection result obtained by the document detection section 14, then temporarily stores the image data which has been subjected to the document skew correction in the storage section 6. Thereafter, the image data which has been subjected to the document skew correction is again inputted into the document detection section 14 from the storage section 6. Subsequently, the document detection section 14 performs a top-bottom determination based on this image data inputted again, and thereafter the document correction section 15 performs a top-bottom direction correction process based on the result of the top-bottom determination. The image data which has been subjected to the top-bottom correction is thereafter temporarily stored in the storage section 6. However, the operations are not limited to this; the skew detection process and the top-bottom determination process may be performed to the image data by the document detection section 14, and a result upon both the processes may be outputted to the document correction section 15 to have the document correction section 15 perform the document skew correction process and the top-bottom direction correction process based on the results of both the processes.

Moreover, in the case where the mode for performing the character recognition process is selected, the document detection section 14 outputs, to the recognition processing section 22, (i) binary image data created based on the image data to which the document skew correction and the top-bottom direction correction have been performed by the document correction section 15, and (ii) a result of carrying out layout analysis process (process of analyzing whether the direction of the character is either written vertically or horizontally) based on the binary image data. It may also be possible to have the document correction section 15 perform the document skew correction and the top-bottom direction correction to the binary image data created by the document detection section 14, and have its result be outputted to the recognition processing section 22.

Moreover, the image data to which the document skew correction process and the top-bottom direction correction process have been performed by the document correction section 15 may be managed as filing data. In this case, the image data is stored in the storage section 6 by for example being compressed into a JPEG code in accordance with a JPEG compression algorithm. In a case where a copy output operation or a printing output operation is instructed for this image data, the JPEG code is read out from the storage section 6 and is outputted to a JPEG expansion section not illustrated, and is converted into RGB data by the JPEG code being decoded. Moreover, in a case where a transmission operation of the image data is instructed to the image data, the JPEG code is read out from the storage section 6 and is transmitted from the communication apparatus 5 to an external apparatus via a network or communication lines.

Figure 5:
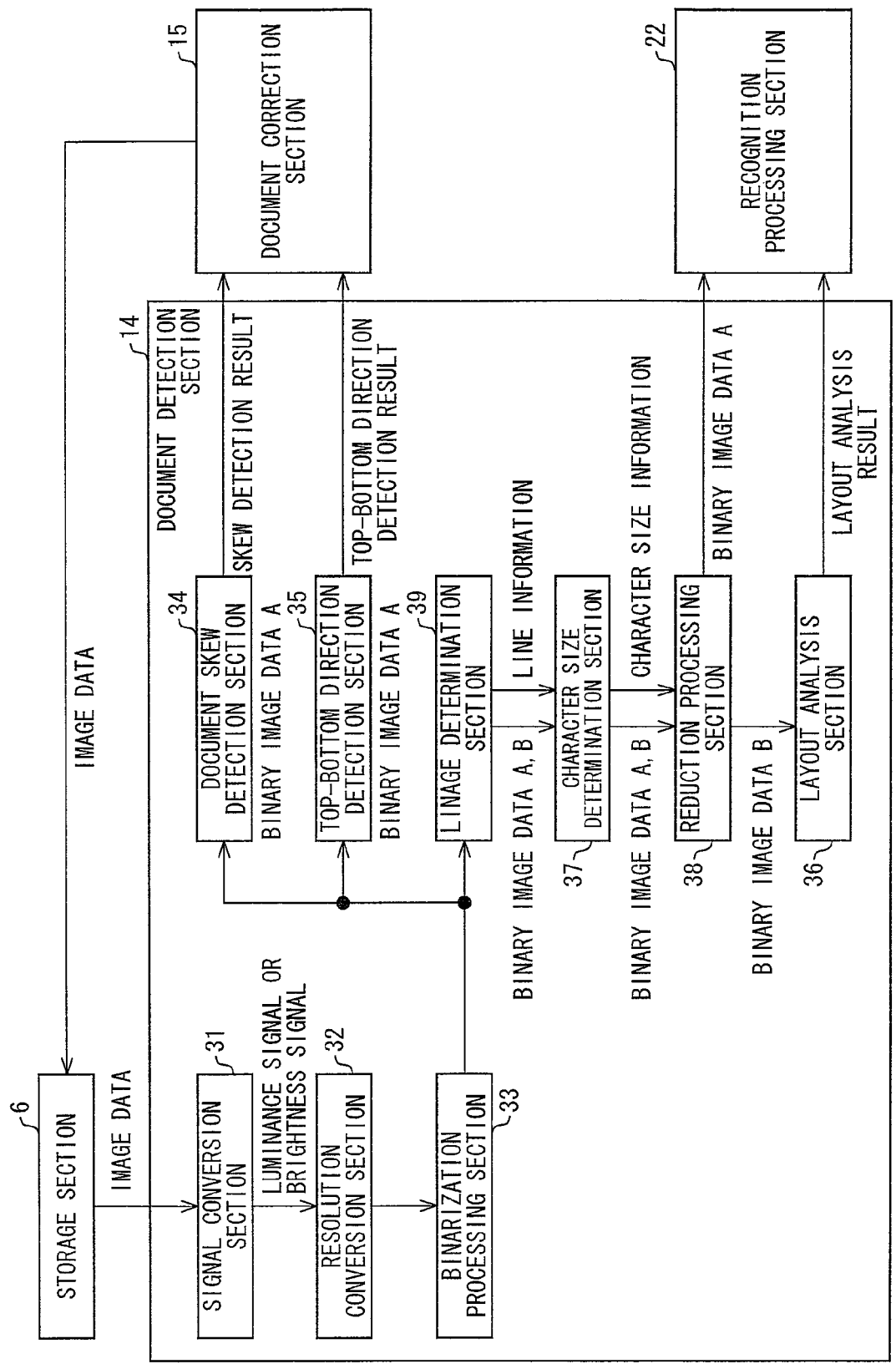
FIG. 5 is a block diagram illustrating a configuration of a document detection section provided in an image processing apparatus according to an embodiment of the present invention.

FIG. 5 is a block diagram schematically illustrating the document detection section 14. As illustrated in FIG. 5, the document detection section 14 includes a signal conversion section 31, a resolution conversion section 32, a binarization processing section 33, a document skew detection section 34, a top-bottom direction detection section 35, a layout analysis section 36, a character size determination section 37, a reduction processing section 38, and a linage determination section 39.

In a case where the image data to which the various processes are performed by the input processing section 13 is a color image, the signal conversion section 31 makes the image data achromatic, that is, converts the color image data into a brightness signal or a luminance signal, and outputs this signal to the resolution conversion section 32.

For example, the signal conversion section 31 converts an RGB signal to a luminance signal Y by calculating $Y_i = 0.30R_i + 59G_i + 11B_i$. Here, Y is a luminance signal of pixels; R, G, and B are color components of RGB signals of the pixels; and the subscript i is a value provided for each pixel (i is an integer not less than 1). Alternatively, the RGB signal may be converted into a CIE1976L*a*b* signal (CIE: Commission International de l'Eclairage, L*: brightness, a*, b*: chromaticity), or alternatively, may use the G signal as the luminance signal Y.

The resolution conversion section 32 converts the resolution of the image data into a low resolution, and outputs the converted image data to the binarization processing section 33. The method to convert the resolution is not particularly limited, and for example the publicly known nearest neighbor interpolation, bilinear interpolation, bicubic interpolation, or average value method may be used to convert the resolution.

In the present embodiment, the resolution conversion section 32 creates (i) image data whose resolution is converted into a first resolution (e.g. 300 dpi) and (ii) image data whose resolution is converted into a second resolution (e.g. 75 dpi) that is lower than the first resolution, which each of image data is created from image data scanned and obtained by the image input apparatus 2 with a resolution of 1200 dpi or 600 dpi.

The binarization processing section 33 binarizes the image data of the first resolution and the image data of the second resolution, which each of image data is converted by the resolution conversion section 32, and creates binary image data A of the first resolution and binary image data B of the second resolution. More specifically, by comparing densities (pixel values) of each pixel in the image data with a preset threshold, the pixel values of the pixels are binarized. For example, if the image data is 8 bits, the threshold is 128. Alternatively, an average value of densities (pixel values) in a block including a plurality of pixels (e.g. 5 pixels×5 pixels) may serve as the threshold. Moreover, the binarization processing section 33 outputs the image data of the first resolution to the document skew detection section 34 and the top-bottom direction detection section 35, and outputs the image data of the first resolution and the image data of the second resolution to the linage determination section 39.

Based on the binary image data A of the first resolution received from the binarization processing section 33, the document skew detection section 34 detects a skew angle of a document from a scanning position (normal document position) when reading an image, and outputs the detected skew angle to the document correction section 15. Namely, in a case where the position of the document is skewed with respect to a scanned position (normal document position) on the image input apparatus 2 at the time when the image is read, the document skew detection section 34 detects the skew angle and outputs the skew angle to the document correction section 15.

The method to detect the skew angle is not particularly limited, and for example conventionally known methods may be used to detect the skew angle. For instance, a method disclosed in Patent Literature 2 may be used. In this method, a plurality of boundary points of black pixels and white pixels (e.g. coordinates of white/black boundary points on an upper edge of each text) are extracted from binarized image data, to obtain dot-sequential coordinate data of each boundary point. As to the boundary of the black pixels and white pixels, for example a coordinate of a white/black boundary point of an upper edge for each of the text is obtained. Thereafter, a regression line is obtained based on the dot-sequential coordinate data, and its regression coefficient b is calculated based on the following formula (1):

$$b = Sxy/Sx \qquad (1)$$

Sx and Sy are a residual sum of squares of variables of x and y, and Sxy is a sum of a product of a residual of x and a residual of y. Namely, Sx, Sy, and Sxy are represented by the formulae (2) to (4):

$$Sx = \sum_{i=1}^{n}(x_i - x)^2 = \sum_{i=1}^{n} x_i^2 - \left(\sum_{i=1}^{n} x_i\right)^2 \Big/ n \qquad (2)$$

$$Sy = \sum_{i=1}^{n}(y_i - y)^2 = \sum_{i=1}^{n} y_i^2 - \left(\sum_{i=1}^{n} y_i\right)^2 \Big/ n \qquad (3)$$

$$Sxy = \sum_{i=1}^{n}(x_i - x)(y_i - y) = \sum_{i=1}^{n} x_i y_i - \left(\sum_{i=1}^{n} x_i\right)\left(\sum_{i=1}^{n} y_i\right) \Big/ n \qquad (4)$$

Thereafter, with the regression coefficient b calculated as described above, a skew angle θ is calculated based on the following formula (5):

$$\tan\theta = b \qquad (5)$$

The top-bottom direction detection section 35 detects a top-bottom direction of the document at the time of reading an image, based on the binary image data A of the first resolution received from the binarization processing section 33. Thereafter, the top-bottom direction detection section 35 outputs the detected top-bottom direction to the document correction section 15.

The method to detect the top-bottom (top-to-bottom) direction is not particularly limited, and a conventionally known method can be used for example. For example, a method disclosed in Patent Literature 3 may be used. In this method, the top-bottom direction of the document is detected as a result of performing the following processes (1) through (6).

(1) Extract each of the characters (texts) in the document and each of the characters are converted to character patterns.

(2) Since the character patterns includes noise other than the characters, select the character patterns which have a high possibility as being a character (for example, character patterns which have an aspect ratio of 1:2 to 2:1).

(3) Compare (match) the feature of the character pattern with character pattern information made into a database. For example, superpose the extracted character pattern (input pattern) onto the character patterns made into a database, and compare the black and white patterns of each pixel of the input pattern with those of the character pattern made into a database on which the input pattern is superposed. If a character pattern which all pixels thereof match those of the input pattern exists in the character patterns made into a database, the character corresponding to that character pattern is distinguished as being the character of the input pattern. Moreover, if there is no character pattern which all pixels thereof match the input pattern, determination is made on whether or not the number of pixels matching reaches a predetermined matching rate. If the number of pixels matching does not reach the predetermined matching rate, the character pattern is determined as not distinguishable. On the other hand, if the character pattern matches a predetermined matching rate, the character corresponding to the character pattern with the most number of matching pixels is determined as the character of the input pattern.

(4) Rotate the extracted character pattern by 90°, 180°, and 270°, and repeat the processes of the foregoing (2) and (3).

(5) The number of characters that is distinguishable in the (2) and (3) are compared between each of the rotation angles (0°, 90°, 180°, and 270°), and a rotation angle having the most number of distinguishable characters is determined as a character direction on the document, which determines the top-bottom direction of the document.

(6) Output one of 0°, 90°, 180°, and 270° as a determination result of the top-bottom direction.

The layout analysis section 36, the character size determination section 37, the reduction processing section 38, and the linage determination section 39 are not operated in the image output mode. Specific details of these sections are described later.

The color correction section 16 reads out from the storage section 6 the image data to which the document skew correction process and the top-bottom direction correction process are performed by the document correction section 15, to convert the image data read out into a CMY (C: cyan, M: magenta, Y: yellow) signal, which colors are complementary colors of the RGB signal. Furthermore, the color correction section 16 performs a process to improve color reproductivity.

The black generation and under color removal section 17 generates a black (K) signal from the three-color signal of CMY which has been subjected to the color correction, and thereafter subtracts the K signal generated from the original CMY signal to create a new CMY signal. This converts the three-color signal of CMY to a four-color signal CMYK.

The spatial filter section 18 carries out a spatial filter process (edge enhancement process and/or smoothing process) to the image data of the CMYK signal received from the black generation and under color removal section 17, with a digital filter based on a segmentation class signal, to correct the spatial frequency characteristics. This reduces blur and graininess in an outputted image.

The output tone correction section 19 performs an output γ correction process for outputting to recording material such as a sheet or the like, and the image data which has been subjected to the output γ correction process is outputted to the halftone generation section 20.

The halftone generation section 20 carries out a tone reproduction process (halftone generation) so that an image can be separated into pixels to reproduce each tone.

The segmentation processing section 21 segments, from the RGB signals, each of the pixels in the input image into a black character (text) region, a color character region, a halftone dot region, and a photograph region (continuous tone region). Based on the segmentation result, the segmentation processing section 21 outputs a segmentation class signal indicative of which region the pixel belongs to, to a respective one of the black generation and under color removal section 17, the spatial filter section 18, and the halftone generation section 20. The black generation and under color removal section 17, the spatial filter section 18, and the halftone generation section 20 performs processes suitable for the respective region based on the received segmentation class signal. The method of the segmentation process is not particularly limited, and a conventional publicly known method may be used.

The recognition processing section (OCR engine) 22, the drawing command generation section 23, and the formatting processing section 24 are not operated in the image forming mode. Details of these sections are later described.

The image data to which the foregoing processes are performed is once stored in the storage section 6 or another memory (not illustrated), and is read out at a predetermined timing to be inputted into the image output apparatus 4.

(1-4. Configuration of Image Processing Apparatus 3 and Operation of Image Transmission Mode)

The following description explains (1) an operation of the image processing apparatus 3 in the image transmission mode, (2) configurations of the layout analysis section 36, the character size determination section 37, the reduction processing section 38, and the linage determination section 39 each provided in the document detection section 14, and (3) configurations of the recognition processing section 22, the drawing command generation section 23, and the formatting processing section 24.

The digital color multifunction peripheral 1 has, as modes in the image transmission mode, a scanning mode (regular reading mode), a ledger sheet OCR mode, and a ledger sheet store mode. A user is to select a tab of their desired mode from among tabs displayed on the display section of the operation panel 8 illustrated in FIG. 6(*a*), FIG. 7(*a*), and FIG. 8(*a*), i.e. from among tab T1 of the scanning mode, tab T2 of the ledger sheet OCR mode, and tab T3 of the ledger sheet store mode.

FIG. 6(*a*) is a view illustrating an example of a display screen displayed on a display section of the operation panel 8 in a case where the tab T1, i.e. the image transmission mode is selected. FIG. 6(*b*) is a view illustrating each of setting values (setting details) selectable by the user for the respective item displayed on the display screen of FIG. 6(*a*).

Figure 7:
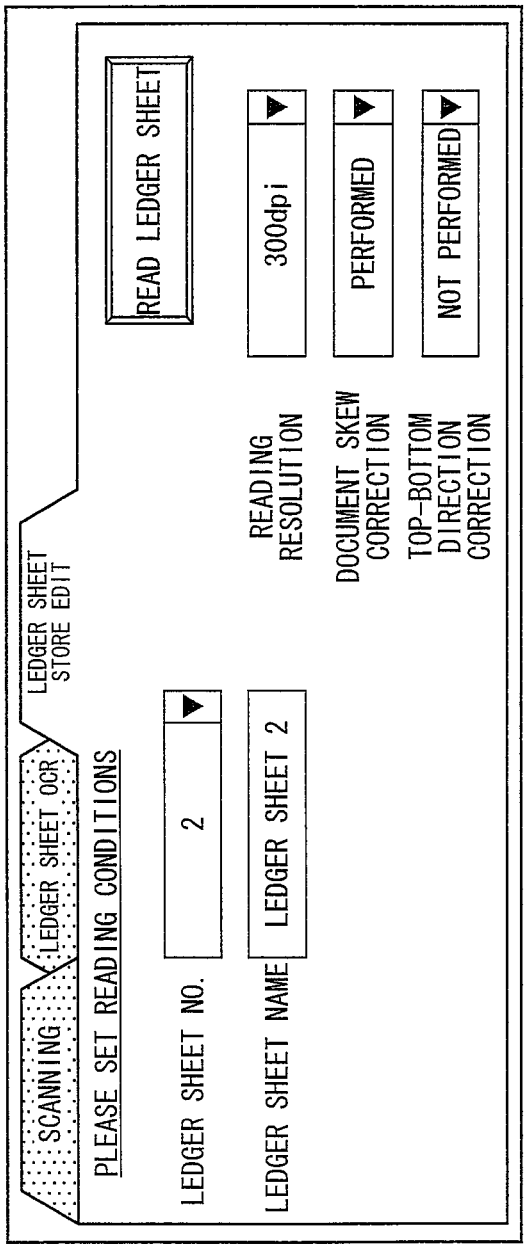
FIG. 7(a) is a view illustrating an example of a display screen displayed on an operation panel of the image forming apparatus illustrated in FIG. 2 and FIG. 3.
FIG. 7(b) is a view illustrating options selectable by a user in the display screen illustrated in FIG. 7(a).
Figure 7:
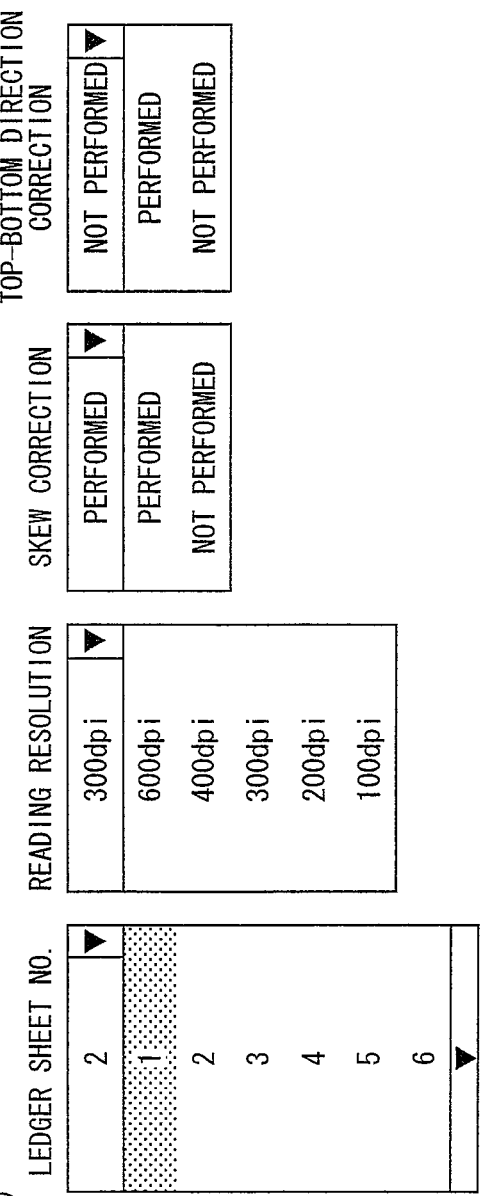

FIG. 7(*a*) is a view illustrating an example of a display screen displayed on the display section of the operation panel 8 in a case where the tab T3, i.e. the ledger sheet store mode is selected. FIG. 7(*b*) is a view illustrating each of setting values (setting details) selectable by the user for the respective item displayed on the display screen of FIG. 7(*a*).

Figure 8:
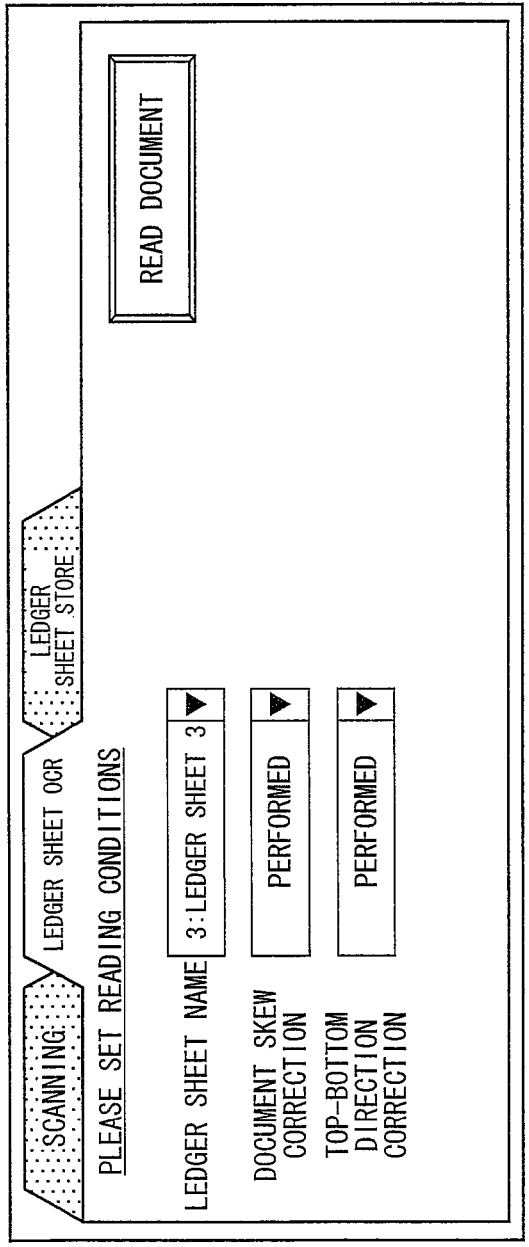
FIG. 8(a) is a view illustrating an example of a display screen displayed on an operation panel of the image forming apparatus illustrated in FIG. 2 and FIG. 3.
FIG. 8(b) is a view illustrating options selectable by a user in the display screen illustrated in FIG. 8(a).
Figure 8:
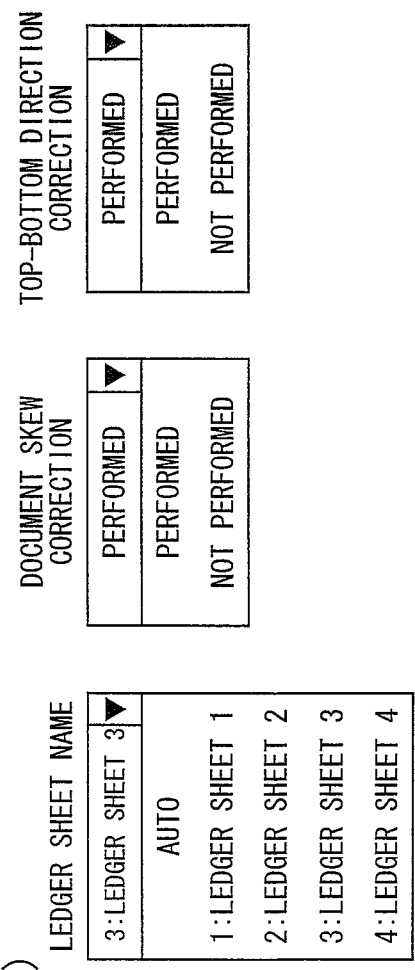

FIG. 8(*a*) is a view illustrating an example of a display screen displayed on the display section of the operation panel 8 in a case where the tab T2, i.e. the ledger sheet OCR mode is selected. FIG. 8(*b*) is a view illustrating each of setting values (setting details) selectable by the user for the respective item displayed on the display screen of FIG. 8(*a*).

(1-4-1. Processes Performed in Scanning Mode)

Figure 1:
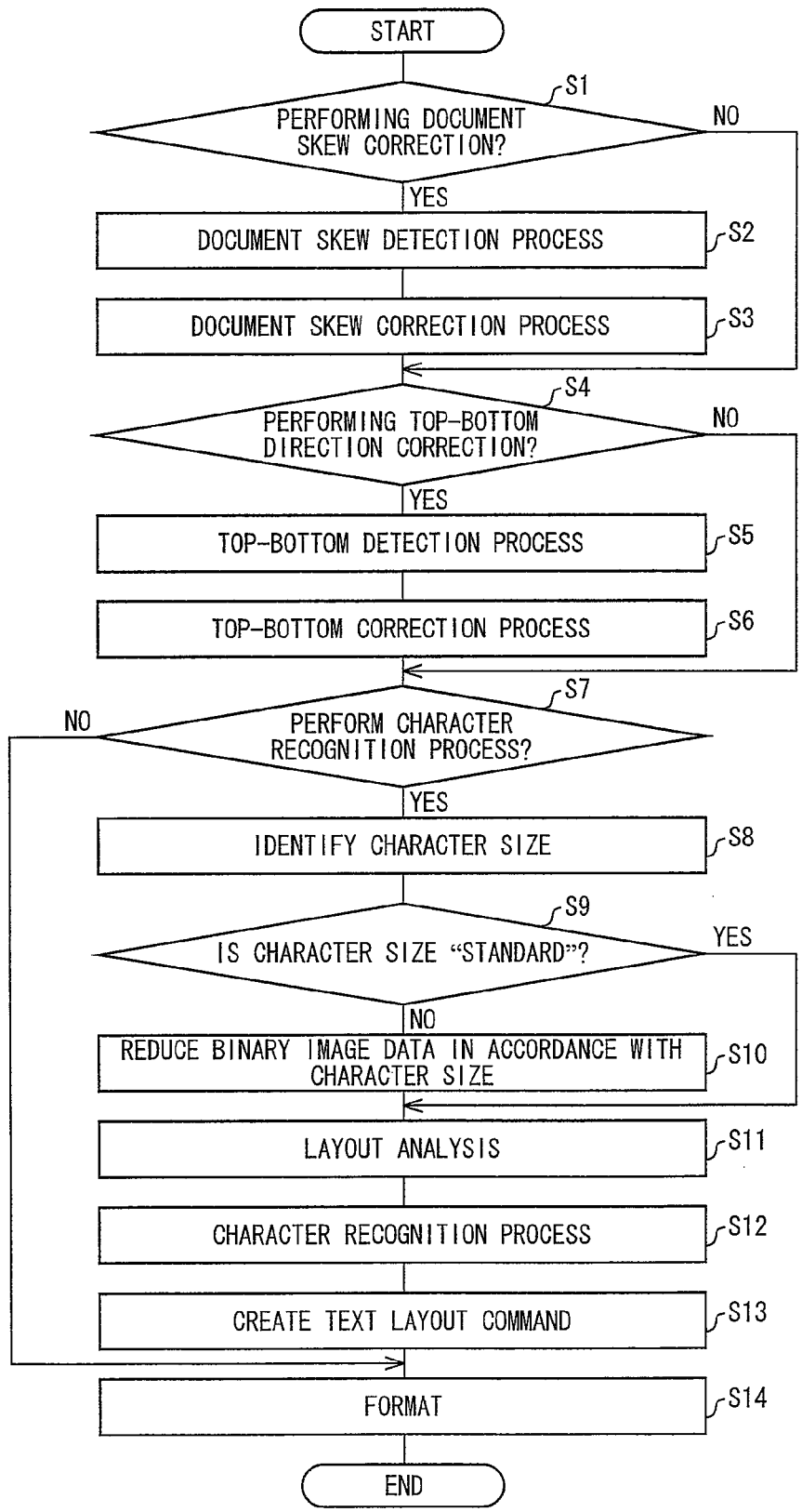
FIG. 1 is a flow chart illustrating a procedure performed in a scanning mode by an image processing apparatus according to an embodiment of the present invention.

First described is the case where the scanning mode is selected. FIG. 1 is a flow chart illustrating a procedure of processes performed by the image processing apparatus 3 in the scanning mode. The details of the processes performed by the image input apparatus 2, the A/D conversion section 11, the shading correction section 12, the input processing section 13, and the segmentation processing section 21 are identical to those in the case of the image forming mode, and therefore descriptions thereof have been omitted here.

As illustrated in FIG. 6(*a*) and FIG. 6(*b*), the user in the present embodiment can select the following items in the scanning mode: (1) format of output image data (in the present embodiment, one of either PDF, PDF (OCR), TIFF, or JPEG); (2) resolution of the output image data (in the present embodiment, one of either 600 dpi, 400 dpi, 300 dpi, 200 dpi, or 100 dpi); (3) color type of the output image data (in the present embodiment, either one of colored, gray scale, or mono 2); (4) whether or not to perform document skew correction; and (5) whether or not to perform top-bottom direction correction.

Moreover, in the scanning mode, a character recognition process is performed just in a case where PDF (OCR) is selected as the format of the output image data. A result of the character recognition is created as transparent text data, which transparent text data is superposed on the image data to create an image file of a PDF (Portable Document Format) format.

Furthermore, in a case where the PDF (OCR) is selected as the format of the output image data, that is, in the case where the character recognition process is to be performed, the user can select (a) an OCR language (in the present embodiment, either Japanese or English) and (b) a character size (in the present embodiment, either "standard", "large", "very large", or "auto").

If a format that does not require performing the character recognition process (PDF, TIFF, or JPEG) is selected as the format of the output image data, the items related to the OCR settings (OCR language, character size) from among the items displayed in FIG. 6(a) are either displayed gray-out or is not displayed.

In a case where the "scan document" button is operated after the items on the display screen in FIG. 6(a) have been set, the control section 7 causes the image input apparatus 2, the A/D conversion section 11, the shading correction section 12, and the input processing section 13 to perform the processes as with the processes described in the image forming mode.

After the processes of the input processing section 13 have been performed, the control section 7 determines whether or not to perform the document skew correction (S1). This determination is sufficiently performed depending on whether or not the user has selected to perform the document skew correction on the display screen illustrated in FIG. 6(a).

If it is determined in S1 to perform the document skew correction, the control section 7 causes the signal conversion section 31, the resolution conversion section 32, and the binarization processing section 33 to perform the processes described above to the image data which has been subjected to the processes performed by the input processing section 13. Based on a result thereof, the control section 7 causes the document skew detection section 34 to perform the document skew detection process (S2), and causes the document correction section 15 to perform the document skew correction process (S3). The document correction section 15 thereafter temporarily stores the image data which has been subjected to the document skew correction process, in the storage section 6.

If it is determined in S1 that no document skew correction is to be performed, or alternatively, after performing the document skew correction in S3, the control section 7 determines whether or not to perform the top-bottom direction correction (S4). This determination is sufficiently made depending on whether or not the user has selected to perform the top-bottom direction correction on the display screen illustrated in FIG. 6(a).

If it is determined in S4 to perform the top-bottom direction correction, the control section 7 reads out from the storage section 6 the image data to which the document skew correction process has been performed in S3 or the image data which has been subjected to the processes performed by the input processing section 13, and causes the signal conversion section 31, the resolution conversion section 32, and the binarization processing section 33 to perform their respective processes as described above, to the image data. The control section 7 then causes the top-bottom direction detection section 35 to perform the top-bottom direction detection process based on a result of the processes performed by the signal conversion section 31, the resolution conversion section 32, and the binarization processing section 33 (S5), and causes the document correction section 15 to perform the top-bottom direction correction process (S6). The document correction section 15 temporarily stores the image data which has been subjected to the top-bottom direction correction process, in the storage section 6.

If it is determined in S4 that no top-bottom direction correction is to be performed, or alternatively, after performing the top-bottom direction correction process in S6, the control section 7 determines whether or not to perform the character recognition process (S7). This determination is sufficiently made for example depending on whether or not the PDF (OCR) is selected as the format of the output image data on the display screen illustrated in FIG. 6(a).

If it is determined in S7 to not perform the character recognition process, the control section 7 proceeds to perform a process of S14 later described.

On the other hand, if it is determined in S7 to perform the character recognition process, the control section 7 identifies which one of "standard (standard size range not larger than a predetermined size)", "large (first size range larger than the predetermined size)", and "very large (second size range larger than the predetermined size)" the character size of the document belongs to (S8). More specifically, if the user has entered on the display screen illustrated in FIG. 6(a) an instruction of selecting one of the "standard", "large", and "very large", the control section 7 identifies the character size (size range to which the character size belongs) in accordance with that selection instruction. If the user has selected "auto", the control section 7 causes the character size determination section 37 that is provided in the document detection section 14 to perform an automatic determination process of the character size (process determining to which of "standard", "large", and "very large" the character size belongs), and identifies the character size (size range to which the character size belongs) depending on the determination result.

In the present embodiment, the character recognition by the recognition processing section 22 determines the character size in the document as the "standard" size (standard size range) in a case where the character size is not larger than an upper limit value (e.g. height of character being 17 mm) in terms of specification of the recognition processing section 22 that a predetermined character recognition accuracy can be achieved, and determines the character size as the "large" size (first size range larger than the predetermined size) in a case where the character size is larger than the upper limit value but not larger than a predetermined value (e.g. twice the upper limit value), and determines as the "very large" size (second size range larger than the predetermined size) in a case where the character size is larger than the predetermined value. However, it is not limited to this case, and a value lower than the upper limit value in terms of specification of the recognition processing section 22 may be set as a threshold; a character size being not larger than this threshold may serve as the "standard" size, a character size being larger than the threshold but not larger than a predetermined value (e.g. twice the threshold) may serve as the "large" size, and a character size being larger than the predetermined value may serve as the "very large" size. Moreover, the upper limit value may be a value publicized as a specification value by a manufacturer of the recognition processing section 22, and may be a result of calculating a recognition successful rate of performing the character recognition process by the recognition processing section 22 based on image data of a sample document on which plural types of characters of a plurality of sizes are printed, to calculate an upper limit value of a character size with which a predetermined recognition successful rate (character recognition accuracy) is achieved. Moreover, the configuration is not limited to one which determines whether the character size belongs to the "standard", "large", or "very large". A further plurality of size ranges may be defined in advance, and determination of which of those size ranges the character size belongs to may be performed.

The method of automatically determining the character size by the character size determination section 37 is not particularly limited. For example, the character size may be automatically determined by any one of methods described in the following (Example 1) to (Example 5).

Example 1

A bound box of a character is found based on binary image data of a first resolution or a second resolution created by the binarization processing section 33, and a histogram of a bound box size (height or width) is prepared, to obtain a most frequent size as the bound box size of that document. Subsequently, a character size is identified based on a preset relationship between the size of the bound box and the character size ("standard", "large", "very large").

The method of finding the bound box is similar to the method of finding the bound box by the layout analysis section described later. Hence, the character size may be automatically determined with use of a calculated result of the bound box by the layout analysis section 36. Alternatively, the bound box may be calculated by the character size determination section 37, and this calculated result may be used in the layout analysis process performed by the layout analysis section 36.

Example 2

A histogram is created of sizes (height or width) of character patterns whose matching rate is high with the character patterns made into a database (character patterns whose matching rate is not less than a predetermined value) from among the character patterns obtained in the top-bottom direction detection process performed by the top-bottom direction detection section 35; the character size ("standard", "large", "very large") of the document is identified based on the most frequent size.

Example 3

Figure 9:
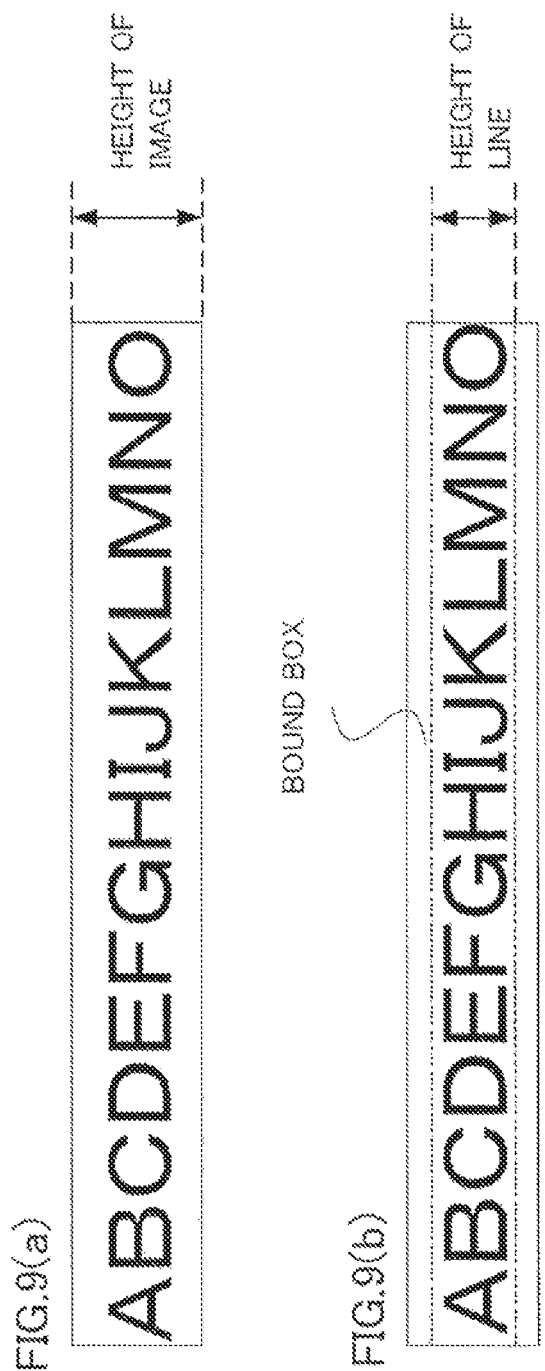
FIG. 9(a) is a view illustrating an example of a method of determining character size by a character size determination section provided in the document detection section illustrated in FIG. 5.
FIG. 9(b) is a view illustrating an example of a method of determining character size by a character size determination section provided in the document detection section illustrated in FIG. 5.

If there is only one line included in the OCR targeted region, the character size determination section 37 detects a height of the OCR-targeted region (height of rectangular OCR-targeted region) based on the binary image data of the first resolution or the second resolution created by the binarization processing section 33, as illustrated in FIG. 9(*a*). Based on this detection result, the character size ("standard", "large", "very large") is identified.

Whether or not the OCR-targeted region includes just one line or includes a plurality of lines may be designated by the user from the operation panel 8, or a linage thereof may be automatically determined by the linage determination section 39.

The method of automatically determining the linage by the linage determination section 39 is not particularly limited in method. For example, a histogram of the number of times white pixels and black pixels are inverted along an extending direction of each line (line extending direction) per line in the image data is created based on the binary image data of the first resolution or the second resolution created by the binarization processing section 33, and the linage may be determined based on this histogram.

In this method, if lines having a number of times the white and black pixels are inverted being not more than a predetermined value (e.g. 20) is present continuously for a predetermined number of lines or more, a region made up of such continuous lines is detected as a blank region. Moreover, if the detected blank region includes a blank region including a first line or a last line, that blank region including the first line or the last line is determined as not a region between lines but a margin of the document, and detects the blank regions excluding that blank region as regions between lines. Thereafter, it is determined whether or not the region between lines exist, and if it is determined as existing, the linage is determined as having a plurality of lines. On the other hand, if no region between lines exists, the linage is determined as one line.

The predetermined number of lines may be set as appropriate, in accordance with (a) a threshold of a height of the region between lines to be determined as a space between lines and (b) a resolution of the image data used in the linage determination process. For instance, in a case where a resolution of a piece of image data is 300 dpi and the threshold is 1 mm, the predetermined number of lines is set as around 12 lines.

Figure 10:
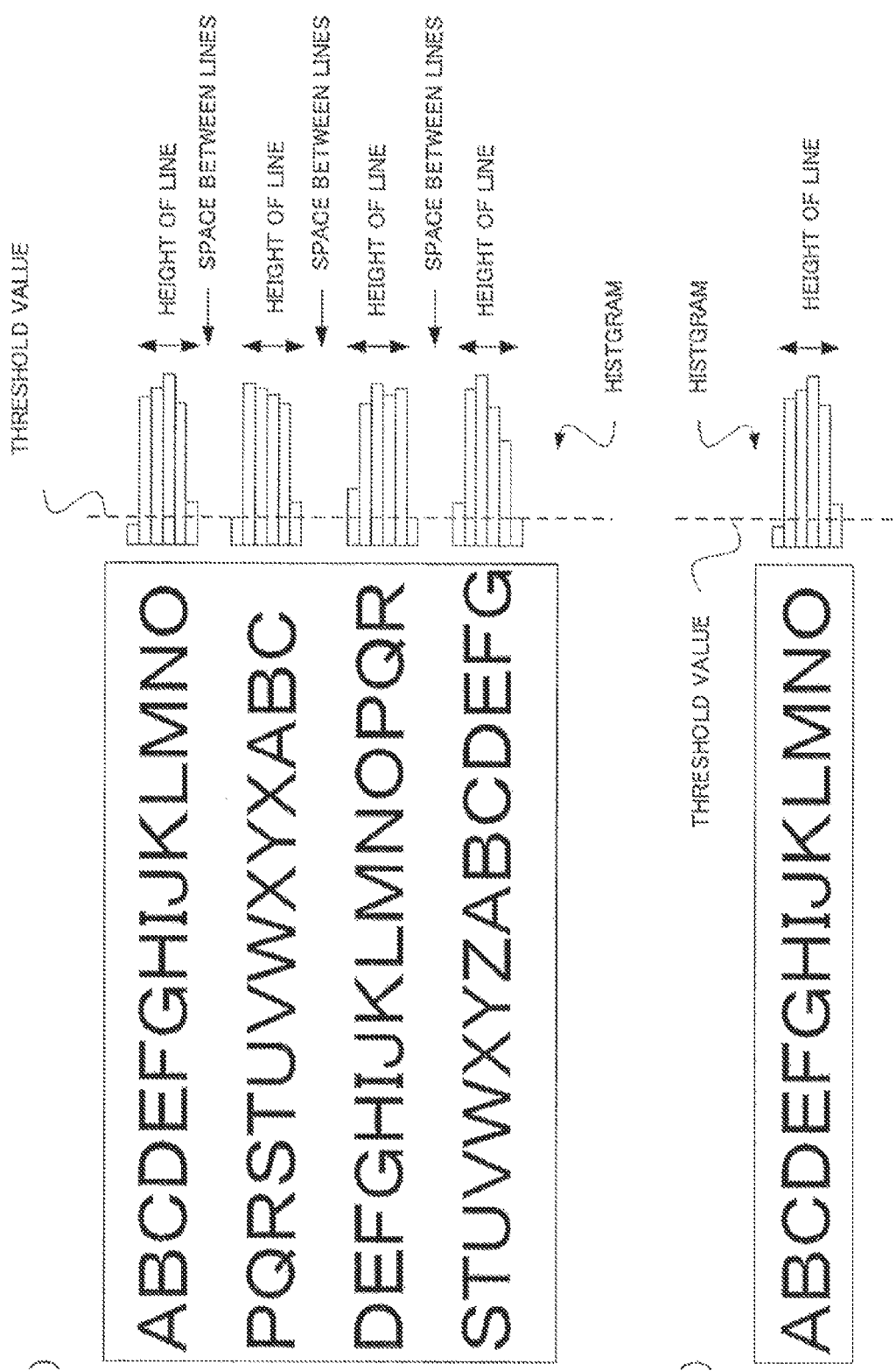
FIG. 10(a) is a view illustrating an example of a method of determining linage by a linage determination section provided in the document detection section illustrated in FIG. 5.
FIG. 10(b) is a view describing an example of a method of determining linage by a linage determination section provided in the document detection section illustrated in FIG. 5.

FIG. 10(*a*) illustrates an example of image data including a plurality of character lines, and illustrates an example of a histogram generated by the linage determination section 39 based on this image data. The image data including a plurality of character lines as illustrated in FIG. 10(*a*) has such a distribution in the number of times the black and white pixels are inverted that the character line part continuously includes lines in which the black and white pixels are inverted a large number of times, and the blank region (region between lines, and margin) includes lines in which the black and white pixels are inverted a small number of times.

FIG. 10(*b*) illustrates an example of image data in a case where the linage is just one line, and illustrates an example of a histogram generated by the linage determination section 39 based on this image data. In the image data including just one line as illustrated in FIG. 10(*b*), the region in which lines that have the black and white pixels inverted a large number of times is the character line part, and the blank regions are the margin.

Hence, it is possible to distinguish whether the image includes a plurality of character lines or includes just one character line by obtaining a distribution of the number of times pixel values are inverted (the number of times the white pixels and black pixels are inverted) along a line direction, and by determining whether or not the image includes a region between lines which is a blank region, excluding a margin. In a case where the continuous part of the lines having not less than the predetermined number of times the black and white pixels are inverted is of a predetermined value (e.g. not less than 1 mm), this continuous part may be extracted as a line. Moreover, a length in a direction perpendicular to the extending direction of the lines of the continuous part may be extracted as a height of the line.

Example 4

If the OCR-targeted region includes only one line, the character size determination section 37 finds a bound box of a group of characters included in the OCR-targeted region based on the binary image data of the first resolution or the second resolution created by the binarization processing section 33, as illustrated in FIG. 9(*b*). Based on the height of the rectangular size, the character size ("standard", "large", "very large") is identified.

Example 5

If the OCR-targeted region includes a plurality of lines, the linage determination section 39 is made to extract a height of the lines included in the OCR-targeted region, to identify the character size ("standard", "large", "very large") based on the height of the extracted line. The method shown in (Example 4) may be used to extract the line by the linage determination section 39.

Next, the control section 7 determines, based on the character size identified in S5, whether or not the character size is the "standard" size, that is, whether or not the character size of the document is not more than an upper limit value in terms of specification of the recognition processing section 22 of which a predetermined character recognition accuracy is attainable in the character recognition by the recognition processing section 22 (S9). If it is determined that the character size is not "standard", namely, if the identified character size is either "large" or "very large", the control section 7 controls the reduction processing section 38 to perform a reduction process to the binary image data of the first resolution or the second resolution created by the binarization processing section 33, in accordance with the identified character size so that a character size of the reduced image data becomes a size within the "standard" size (S10). Thereafter, the control section 7 causes the binary image data of the second resolution which has been subjected to the reduction process to be outputted to the layout analysis section 36, and causes the binary image data of the first resolution which has been subjected to the reduction process to be outputted to the recognition processing section 22.

On the other hand, if the character size is determined as the "standard" size, the control section 7 controls the reduction processing section 38 to output, to the layout analysis section 36, the binary image data of the second resolution created by the binarization processing section 33 without performing the reduction process thereto, and output, to the recognition processing section 22, the binary image data of the first resolution without performing the reduction process thereto. Thereafter, the process proceeds to S11 later described.

More specifically, as illustrated in FIG. 11(*a*), in a case where the character size is "large", the image size is reduced to half the original size, and if the character size is "very large", the image size is reduced to a quarter of the original size. Namely, a separate reduction ratio for reducing the characters that have been determined as belonging to the size ranges of "large" or "very large" to a size not larger than the predetermined size is set in advance for each of those size ranges, and the reduction process is performed based on the reduction ratio corresponding to the size range to which the character belongs.

The character size may be classified as not the "standard", "large", or "very large" size, but in a size in accordance with the height of the characters. In this case, a reduction ratio (reduction power) of the image data is set in accordance with a character size corresponding to the height of the character, as illustrated in FIG. 11(*b*).

Moreover, if the identified character size is the "standard" size, the reduction processing section 38 sets the reduction power as a same size. That is to say, the reduction processing section 38 outputs the binary image data of the second resolution created by the binarization processing section 33 as it is to the layout analysis section 36, and outputs the binary image data of the first resolution created by the binarization processing section 33 as it is to the recognition processing section 22.

In the present embodiment, the reduction ratio of the image data corresponding to the respective character size is set as the power of 2. In this case, the reduction process can be performed by calculating an average value of pixel values of masks (blocks) of 2×2 or 4×4, and thereafter substituting this average value to one pixel. Consequently, it is possible to simplify the reduction process. However, the reduction ratio is not limited to this, and may be set to a value other than a value of the power of 2.

Subsequently, the control section 7 controls the layout analysis section 36 to perform a layout analysis process which analyzes, based on the binary image data of the second resolution, whether the characters contained in the image data are written vertically or horizontally (S11). The layout analysis section 36 requires just recognizing an overview of the layout and does not necessarily require using a highly precise image data. Hence, in the present embodiment, the layout analysis process is performed by use of the binary image data of the second resolution which has a lower resolution than that of the binary image data of the first resolution that is used in the document skew detection section 34 and the top-bottom direction detection section 35.

Figure 12:
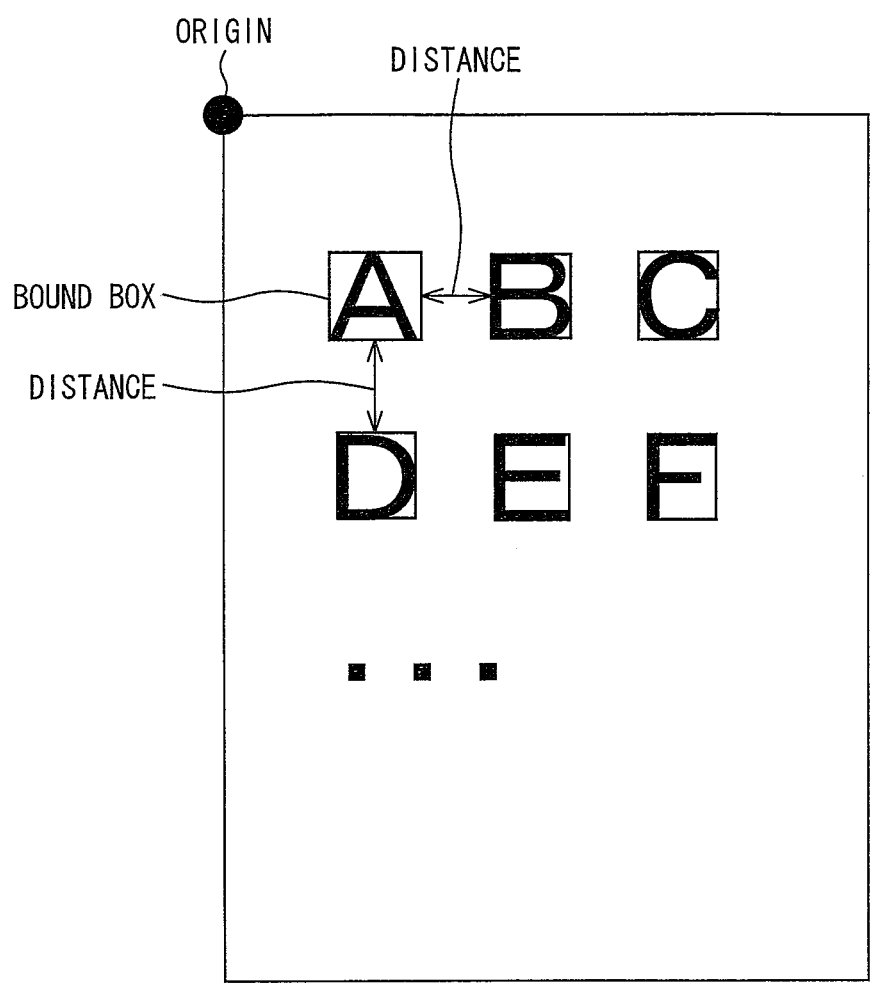
FIG. 12 is a view describing a method of analyzing a layout in a layout analysis section provided in the document detection section illustrated in FIG. 5.

More specifically, as illustrated in FIG. 12, the layout analysis section 36 finds bound boxes of characters and determines whether the characters are written vertically or horizontally based on a distance between the bound boxes. The bound boxes of the characters are found by performing the following processes (1) to (4).
(1) A first line (top line) serves as a noted line, and a black pixel therein is labeled.
(2) The noted line is shifted to a one lower line, and a black pixel therein is labeled differently from the foregoing label.
(3) A connection state of the black pixel in the noted line and the black pixel in the one upper line is determined; if the two black pixels are connected, it is determined that the pixels are connected and the label of the black pixel in the noted line is replaced with an identical label to the black pixel in the one upper line that is connected to the black pixel in the noted line.
(4) The foregoing process is successively performed for each line, to extract the characters based on the labeled result in each of the lines. The bound box is extracted based on pixel positions (pixel coordinates) of a respective top end, bottom end, left end and right end of the extracted characters. The pixel coordinates are found by having a top left edge of the scanned image data serve as an origin.

Thereafter, the control section 7 controls the recognition processing section 22 to perform the character recognition process to the image data based on the binary image data of the first resolution received from the reduction processing section 38 and a layout analysis result (whether the character is written vertically or horizontally) received from the layout analysis section 36. A result of the character recognition process is then outputted to the drawing command generation section 23 (S12).

More specifically, the recognition processing section 22 extracts features of the characters included in the image data based on the binary image data of the first resolution received from the reduction processing section 38, and character recognition is performed by comparing the extracted result with features of characters contained in dictionary data. Thereafter, a character code corresponding to a similar character is detected. As the dictionary data, dictionary data corresponding to the OCR language selected on the display screen illustrated in FIG. 7(*a*) may be used. Moreover, in the example illustrated in FIG. 7(*a*), either Japanese or English is selectable as the OCR language. However, it is not limited to these two languages, and other languages can be made selectable. Furthermore, a character type (e.g. numerals, alphabetical letters, symbols, Katakana) or a combination of character types (e.g. a combination of numerals and symbols) can be made selectable, and dictionary data according to the selected character type may be used.

Moreover, in extracting the features of characters included in the image data, the recognition processing section 22 may be made to perform recognition process of words made with adjacent characters, based on a determination result of the layout analysis section 36 (whether it is written vertically or horizontally). That is to say, words written on the document may be recognized by matching a combination of characters written adjacently in the direction according to the layout analysis result with word data included in the dictionary data. Moreover, in a case where a plurality of candidates are detected of characters (or words) corresponding to the characters (or words) contained in the image data, these plurality of candidates may be outputted as a character recognition process result to the drawing command generation section 23.

Next, the control section 7 controls the drawing command generation section 23 to create an instruction to dispose in the image file a transparent text corresponding to the character recognition result obtained by the recognition processing section 22 (S13). In the embodiment, the transparent text is data for superposing (or embedding) a recognized character (or, characters and word) as text information on the image data in such a manner that it is not visually seen from its appearance. For example, with a PDF file, usually an image file on which a transparent text is added onto image data is used.

Subsequently, the control section 7 controls the formatting processing section 24 to (i) create, based on the image data received from the halftone generation section 20, an image file (output file) of a format designated by the user on the display screen illustrated in FIG. 6(a) (S 14) and (ii) perform a file output process, such as transmitting the created image file to a predetermined destination via the communication apparatus 5 or storing the created image file in the storage section 6 or on a recording medium mounted detachable from the digital color multifunction peripheral 1. This terminates the process. More specifically, in a case where the PDF (OCR) is selected as the format of the output image data, an image file of a PDF format is created, in which a transparent text is embedded to the image data received from the halftone generation section 20, embedded in accordance with an instruction received from the drawing command generation section 23. Moreover, if a format other than the PDF (OCR) format (PDF, TIFF, or JPEG) is selected as the output image data format, an image file of that format is created.

Although not illustrated in FIG. 1, the control section 7 controls each of the sections of the image processing apparatus 3 so that image data having a resolution and a color type selected on the display screen of FIG. 6(a) is outputted from the halftone generation section 20 to the formatting processing section 24.

More specifically, the control section 7 controls the resolution conversion section 32 provided in the document detection section 14 to convert the image data outputted from the input processing section 13 to image data that has the resolution selected in FIG. 6(a). At this time, the processes to be performed by the signal conversion section 31, the binarization processing section 33, and the document skew detection section 34 of the document detection section 14, and processes to be performed by the document correction section 15 are all skipped (is not performed), and the image data outputted from the document correction section 15 is stored in the storage section 6.

Moreover, the control section 7 controls the color correction section 16 to cause color conversion to the image data of the color type selected in FIG. 6(a). For example, in a case where Colored is selected as the color type, the control section 7 controls the color correction section 16 to convert the image data of R, G, and B received from the document correction section 15, which image data is dependent on image scanning characteristics of the image input apparatus 2, to image data of R', G', and B' which are compatible with display characteristics of generally available display devices (e.g. sRGB data). Moreover, in a case where Gray Scale is selected as the color type, the image data of R, G, and B received from the document correction section 15, which image data is dependent on the image scanning characteristics of the image input apparatus 2, is converted into gray scale image data. Moreover, in a case where Mono 2 is selected as the color type, the image data of R, G, and B received from the document correction section 15, which image data is dependent on the image scanning characteristics of the image input apparatus 2, is converted into black-and-white binary image data.

In the image transmission mode, the control section 7 does not cause the black generation and under color removal section 17 and the halftone generation section 20 to carry out any processes. The control section 7 causes each of the black generation and under color removal section 17 and the halftone generation section 20 to output (pass through) the image data received from a previous processing section as it is to a subsequent processing section.

Moreover, the control section 7 controls the spatial filter section 18 to perform a spatial filter process (edge enhancement process, smoothing process) with a digital filter based on a segmentation class signal. Moreover, the control section 7 controls the output tone correction section 19 to perform a predetermined output tone correction process.

Figure 13:
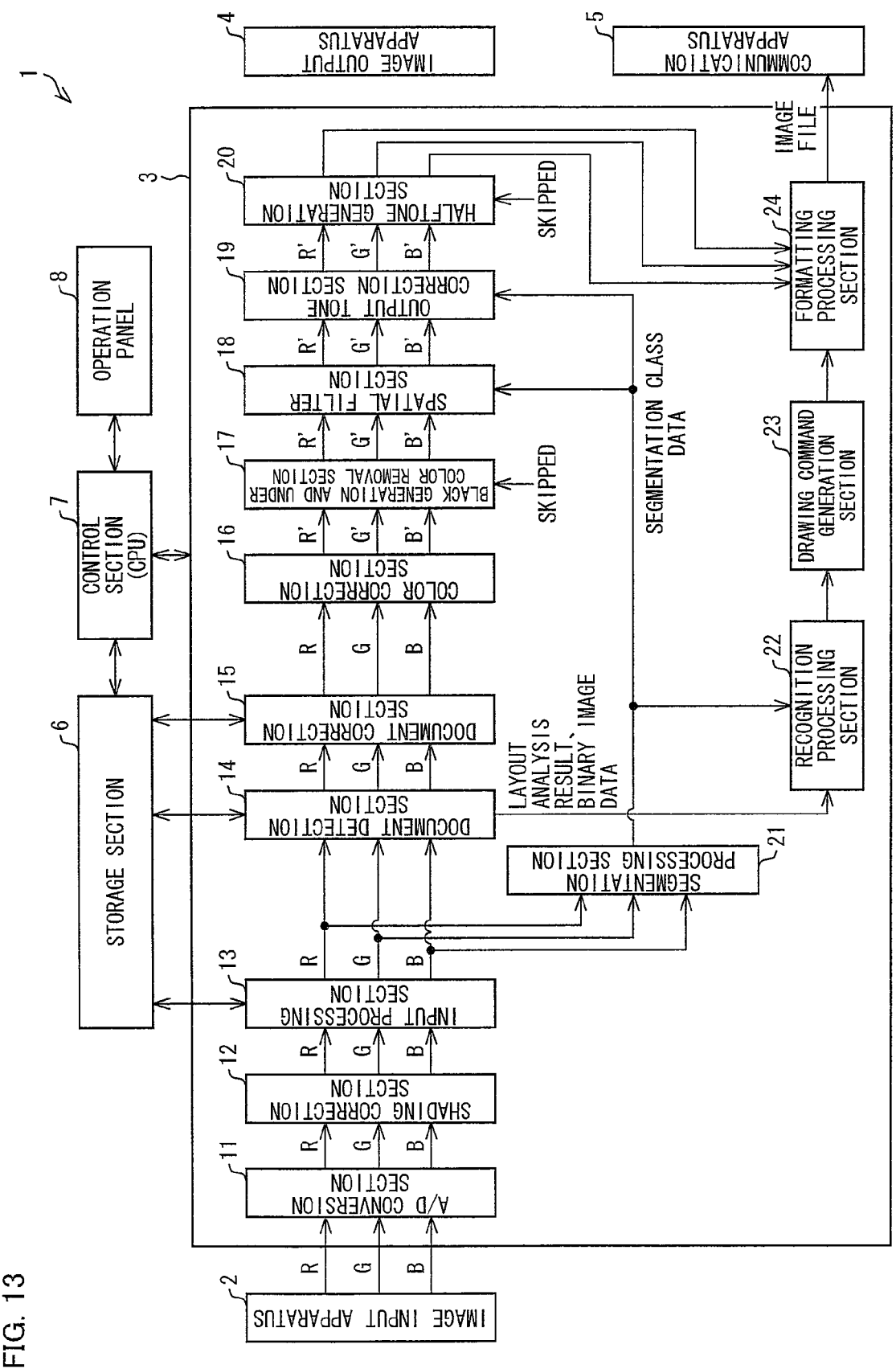
FIG. 13 is a block diagram illustrating a modification of the image forming apparatus illustrated in FIG. 2 and FIG. 3.

In the present embodiment, the recognition processing section 22 is to perform the character recognition process based on (i) the binary image data received from the document detection section 14 and (ii) the layout analysis result. However, the method of performing the character recognition process is not limited to this method. For example, as illustrated in FIG. 13, the segmentation class signal outputted from the segmentation processing section 21 may be inputted into the recognition processing section 22, to have the recognition processing section 22 create a text map indicative of a character region (image region including pixels determined as a character edge) based on the segmentation class signal, and the character recognition process is performed just to the character region of the binary image data inputted into the document detection section 14 in consideration of the layout analysis result.

Figure 14:
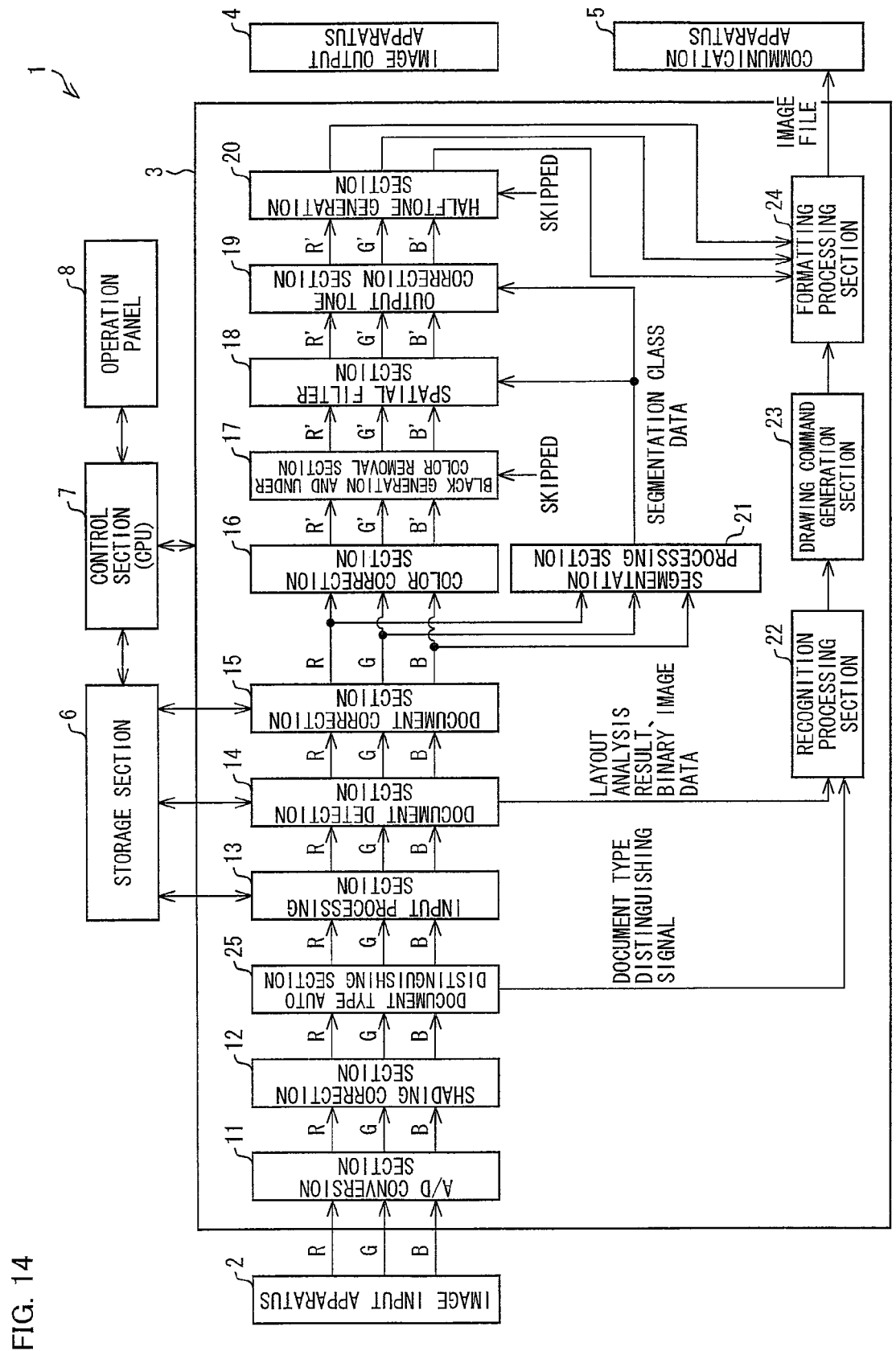
FIG. 14 is a block diagram illustrating a modification of the image forming apparatus illustrated in FIG. 2 and FIG. 3.

Moreover, as illustrated in FIG. 14, an automatic document type discrimination section 25 may be provided for distinguishing the type of document based on the image data. In this case, a document type distinguishing signal outputted from the automatic document type discrimination section 25 is inputted into the recognition processing section 22. Just in a case where the document type distinguishing signal indicates that the document is a document including characters (e.g. character document, character printed-picture document, character photographic-picture document), the recognition processing section 22 performs the character recognition process based on the binary image data and the layout analysis result each received from the document detection section 14. The method of distinguishing the document type by the automatic document type discrimination section 25 is not particularly limited as long as it is a method which at least can distinguish between a document including characters and a document including no characters, and various conventionally known methods may be used to distinguish the documents.

In the present embodiment, the formatting processing section 24 creates an image file in which a transparent text data in accordance with the character recognition result is embedded into image data. However, it is not limited to this method. For example, the formatting processing section 24 may create an image file in which text data in accordance with the character recognition process result is associated with the image data in a different method from the transparent data. Moreover, the text file in accordance with the character recognition process result may be created separately from the image file in which the image data is to be stored.

Although the character size is distinguished uniformly throughout the document in the scanning mode of the present embodiment, the present invention is not limited to this. The character size may be distinguished for each region or for each line in the document, and may determine whether or not to perform the reduction process for each region or for each line. Moreover, in a case where the character size is to be distinguished for each region on the document, the regions can be set in accordance with instructions from the user, or the regions can be set in accordance with a result of a segmentation process performed by the segmentation processing section 21.

(1-4-2. Processes Performed in Ledger Sheet Store Mode)

Next described is processes performed in the ledger sheet store mode. In the ledger sheet store mode of the present embodiment, the following are stored in advance as to a document (ledger sheet document) of a predetermined ledger sheet format: a ledger sheet number (ledger sheet identification information); an OCR region (character recognition processing region) which is a region on a document which is to be subjected to the character recognition process (OCR process); and OCR conditions (character recognition processing condition) which are processing conditions for carrying out the character recognition process to the OCR region. Thereafter, when a character recognition process of a ledger sheet document is performed in the ledger sheet OCR mode later described, the character recognition process is performed based on the registered OCR region and OCR conditions.

The ledger sheet store mode allows for performing a newly storing process to store a new ledger sheet format, and for editing the OCR region and/or the OCR conditions of the ledger sheet document that is already stored.

Figure 15:
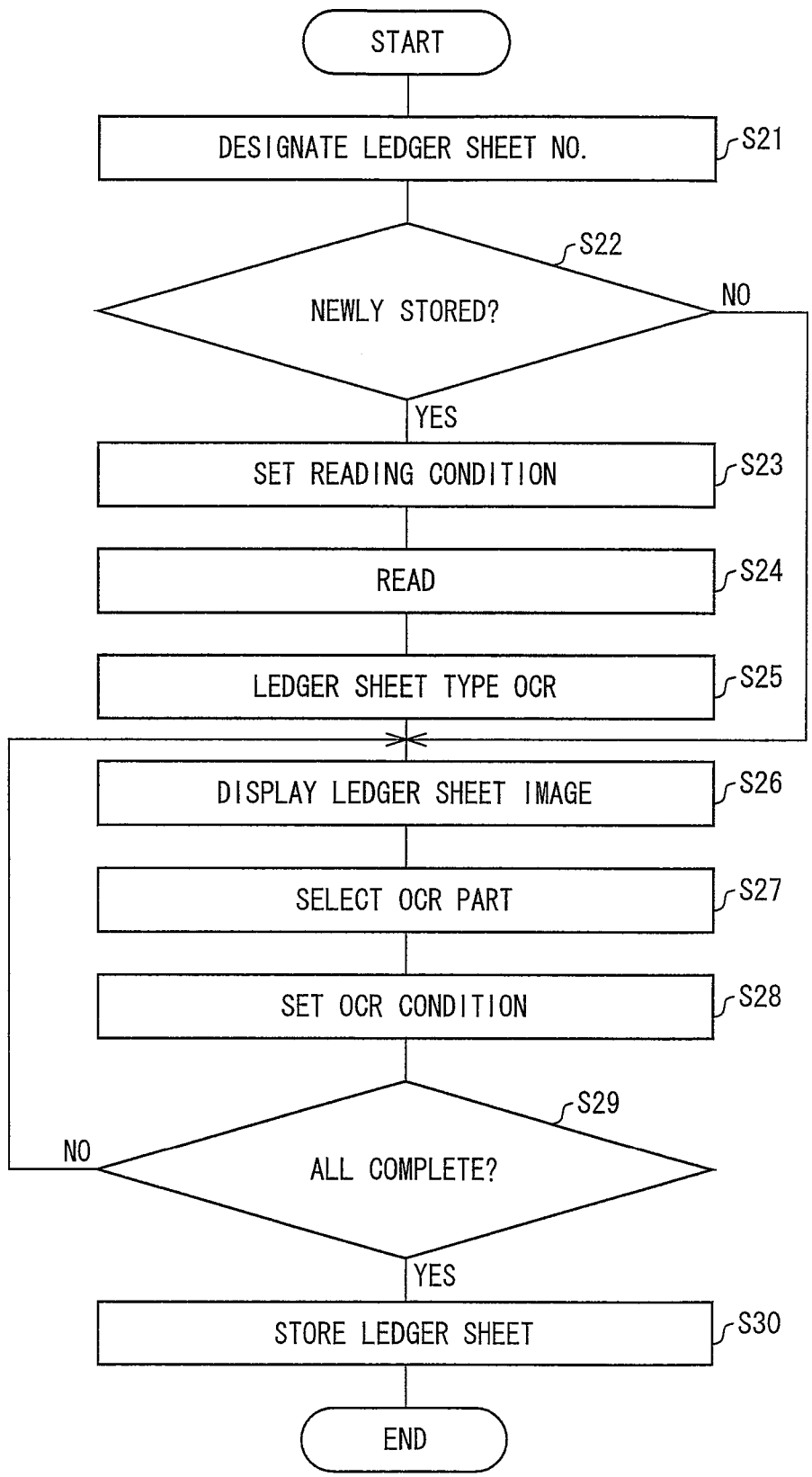
FIG. 15 is a flow chart illustrating a procedure followed in a ledger sheet store mode of an image processing apparatus according to an embodiment of the present invention.

FIG. 15 is a flow chart illustrating procedures of processes performed by the image processing apparatus 3 in the ledger sheet store mode.

A user first selects a ledger sheet number on the display screen illustrated in FIG. 7(a) (S21). Once a ledger sheet number is selected, determination is made of whether a new ledger sheet is to be stored or not based on the selected ledger sheet number (S22).

More specifically, a list of ledger sheet numbers as illustrated in FIG. 7(b) shows up on the display section of the operation panel 8 by touching a part on the display screen illustrated in FIG. 7(a) of an input region for selecting the ledger sheet number (e.g. part with the triangular symbol). In this list, ledger sheet numbers already stored with an OCR region and OCR conditions are displayed having a background region of a different color from that of ledger sheet numbers storing no OCR region and OCR condition. This allows for the user to select a preferable number from among the vacant ledger sheet numbers in the case of performing a process to newly store the OCR region and OCR conditions, and allows for the user to select a ledger sheet number of the ledger sheet that the user wants to edit its OCR region and OCR conditions from among the occupied ledger sheet numbers, in a case of performing an editing process. Moreover, the control section 7 determines that a new ledger sheet is to be stored in the case where a vacant ledger sheet number is selected, and determines that a ledger sheet is to be edited in the case where an occupied ledger sheet number is selected.

As illustrated in FIG. 7(a), when the user selects a desired ledger sheet number from the list, a ledger sheet name of the ledger sheet corresponding to that ledger sheet number is to be displayed on the display section of the operation panel 8. If the selected ledger sheet number is a vacant ledger sheet number, the ledger sheet name displayed is one set as default (in the present embodiment, is a ledger sheet name in which a ledger sheet number is combined with a text string of "ledger sheet"; e.g., "ledger sheet 2", "ledger sheet 3"). As to the ledger sheet names of occupied ledger sheet numbers, the user may edit the name in any way, by operating the operation panel 8.

Moreover, when the tab T3, i.e. the ledger sheet store mode is selected, an initial (default) display is blank (nothing is selected) in the ledger sheet number column. However, the ledger sheet number 1 may be selected, or a smallest ledger sheet number of the vacant ledger sheet numbers may be selected.

In a case where it is determined in S22 that a ledger sheet is not newly stored, i.e. if it is determined in S22 that an editing process is to be performed, the control section 7 performs the process of S26.

On the other hand, if it is determined in S22 that a new ledger sheet is to be stored, the control section 7 accepts a reading condition entered by the user from the operation panel 8 (S23). In the present embodiment, the user can select, as the reading condition settings, a reading resolution, whether or not to carry out the document skew correction, and whether or not to carry out the top-bottom direction correction, as illustrated in FIG. 7(a). As to the reading resolution, a resolution desired by the user is to be selected from among 100 dpi, 200 dpi, 300 dpi, 400 dpi, and 600 dpi, as illustrated in FIG. 7(b). The reading resolution, whether or not to carry out the document skew correction, and whether or not to carry out the top-bottom direction correction each set in S23 are stored as common OCR conditions for ledger sheet documents that are to be newly stored.

Once the user sets the reading conditions in S23 and operates the "read ledger sheet" button, the control section 7 controls the image input apparatus 2 to perform the reading process of the ledger sheet document which is subjected to the storing process (S24). Moreover, the control section 7 controls the recognition processing section 22 to perform a character recognition process (ledger sheet type OCR process) based on the image data obtained by reading the ledger sheet document, of ledger sheet type information printed on a predetermined position b1 on the ledger sheet document (bottom-right edge part in the present embodiment) (S25).

Next, the control section 7 causes the display section of the operation panel 8 to display an image corresponding to image data obtained by reading the ledger sheet document in S24 (S26).

Figures 17A, 17B, 17C, 17D, 17E:
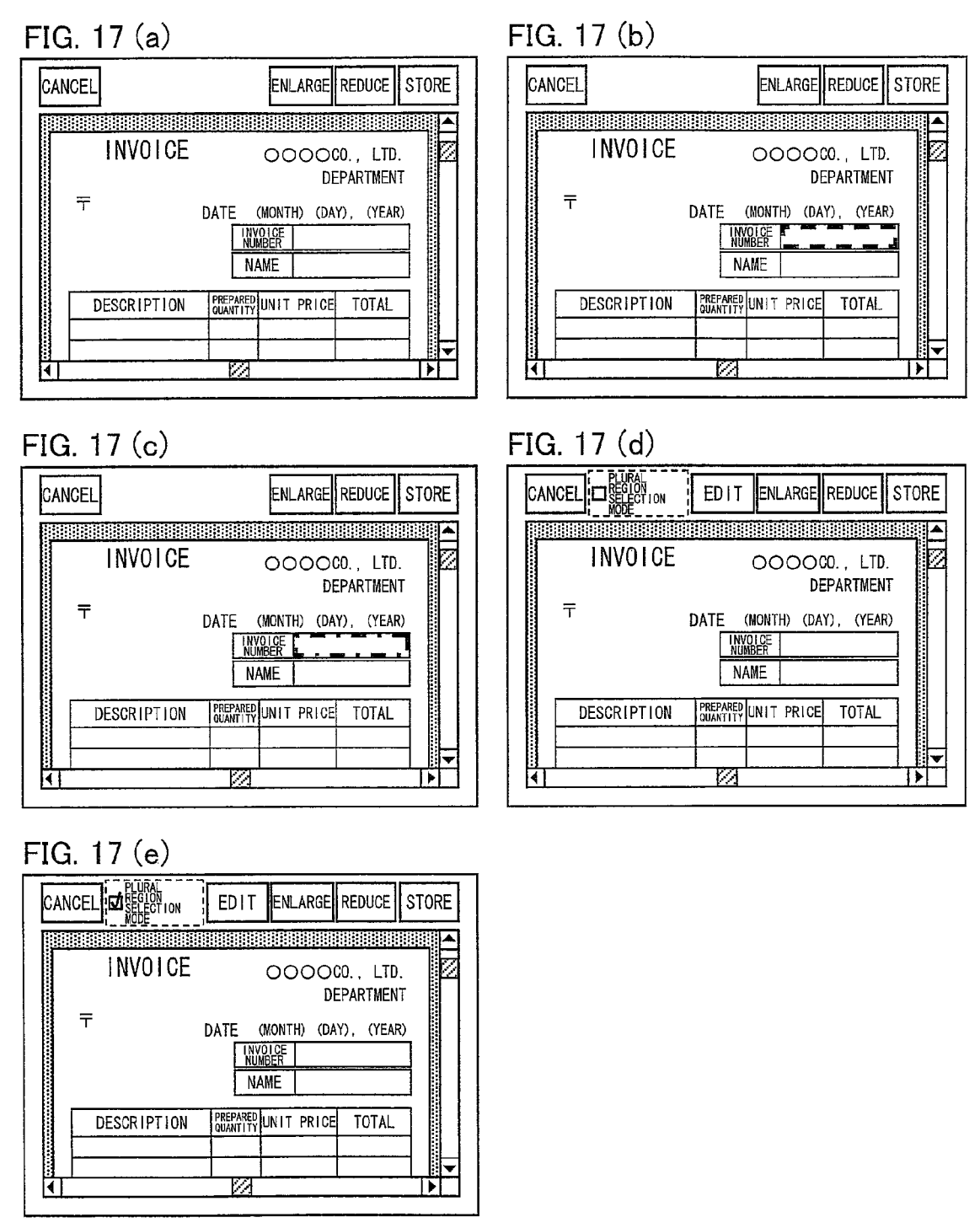

FIG. 16 is a view illustrating an example of a ledger sheet document to which the newly storing process is performed. FIG. 17(a) is a view describing an example of an image displayed on the display section of the operation panel 8 based on the image data obtained by reading the ledger sheet document illustrated in FIG. 16. It is preferable that the ledger sheet document used in performing the newly storing process includes no details such as numerical values and names in the entry items in the ledger sheet as like in the example of FIG. 16. However, it is not limited to this, and ones that include numerical values and names in the entry items may also be used.

As illustrated in FIG. 17(a), the display section of the operation panel 8 displays an image of the ledger sheet document, and also each of buttons "cancel", "enlarge", "reduce", and "store". When the button "enlarge" or "reduce" is operated, the control section 7 displays on the display section of the operation panel 8 the ledger sheet document respectively enlarged or reduced. Moreover, when the button "cancel" is operated, the control section 7 deletes the image data read in S24, returns to the process of S21 and causes display of the display screen shown in FIG. 7(a).

Next, the control section 7 accepts a selection instruction of an OCR region (part in the document to be subjected to the character recognition process) selected by the user from the operation panel 8 (S27).

For instance, in a case where the regions surrounded by thick lines in FIG. 18 are designated as the OCR regions, regions as like regions a1 to a3 that are not surrounded by borders are designated by the user by designating a starting point S and an end point E of a region which is to serve as the OCR region. More specifically, as illustrated in FIG. 19(a), a position set as the starting point S of the OCR region in the document image displayed on the display section of the operation panel 8 is touched with a finger, a stylus pen or the like, and the finger, stylus pen or the like is moved to the position serving as the end point E without taking off the finger, stylus pen or the like from the display section. Once the finger, stylus pen or the like reaches the end point E, the finger, stylus pen or the like is taken off the display section. This designates the starting point S and the end point E. As a result, a rectangular OCR region is set as illustrated in FIG. 19(b), in which the starting point S and the end point E are disposed diagonally to each other and serving as angular points.

Moreover, regions surrounded by borders as like regions a4 to a6 are designated as a block serving as the OCR region by the user touching the region surrounded by the borders to serve as the OCR region with their finger, a stylus pen or the like, and thereafter releasing the finger, pen or the like therefrom. More specifically, as illustrated in FIG. 20(a), when the user touches a point in the block with their finger, a stylus pen or the like, the control section 7 detects the block (thick line section in FIG. 20(b)) including the point touched by the user as illustrated in FIG. 20(b). This designates the region surrounded by the border as the OCR region. The method of detecting the block is not particularly limited, and for example a conventionally known method may be used. Moreover, if an area (size) of the region detected as the block including the point touched by the user is not less than a predetermined value (e.g. not less than 100,000 pixels), or if the block is in contact with the periphery of the ledger sheet document, the control section 7 may determine that the region is not surrounded by borders, give a warning to the user, and not set this region as the OCR region.

Moreover, whether the point on the display screen first touched by the user is to designate the starting point S or is to designate a block may be determined by determining whether a distance between the first touched point to a position where the touch is released is not less than a predetermined value (e.g. in a case where the resolution of the display section is 300 dpi, which is a distance corresponding to 50 pixels).

Next, the control section 7 receives an instruction entry from the user regarding the OCR conditions of the OCR region selected in S27, and sets the OCR conditions in accordance with this instruction entry (S28).

For example, the regions whose OCR conditions are not set from among the regions selected as the OCR regions in S27 are displayed so that outer edges thereof are displayed with a border of a predetermined color (e.g. a red border; in FIG. 17(b), this state is illustrated by having the outer edges be illustrated in broken line borders), as illustrated in FIG. 17(b). When the user again touches that region, the process switches over to the OCR condition setting process of that region.

Moreover, the regions whose settings of its OCR conditions have been completed from among the regions designated as the OCR region is to be displayed with a border of a different color from that of the regions whose settings of the OCR conditions have not been completed yet, as illustrated in FIG. 17(c) (e.g. blue border; in FIG. 17(c), the border is illustrated with an alternate long and short dash line). When the user touches the region whose OCR conditions has been set, the process switches over to a setting process (editing process) of the OCR conditions.

The setting process of the OCR region and the setting process of the OCR conditions may be set so that upon setting the OCR region, the OCR condition of that OCR region is continuously set. Alternatively, all the OCR regions on the document may be set first, and the setting of the OCR conditions of respective OCR regions may be successively set thereafter. Moreover, any one or a plurality of OCR regions may be selected by any timing by the user after a plurality of OCR regions are set, to set the OCR conditions of the selected OCR region(s).

As illustrated in FIG. 17(d), a "plural region selection mode" button and an "edit" button are provided to allow for selecting a plurality of the OCR regions. FIG. 17(e) illustrates a state in which the "plurality selection mode" is ON; an OCR region becomes in a selected state by touching that OCR region. When the OCR region in the selected state is touched, the selected state of that OCR region is released (toggle operation which switches between ON and OFF every time the region is touched). After consecutively selecting the preferable OCR regions, the user can touch the "edit" button to switch over to the editing mode. This allows for the user to collectively set the OCR conditions. It may also be possible to allow the mode to switch over to the editing mode for collectively setting the OCR conditions, by touching the selected OCR regions for a length of time.

In a case where a plurality of OCR regions are selected, information unique to the OCR region cannot be edited. Hence, in the editing screen, the "item number" and the "item name" are either grayed out or not displayed at all as illustrated in FIG. 21(e), and just the items that can be commonly set, i.e. "character size", "linage", and "character type" are displayed and are available for change.

FIG. 21(a) is a view illustrating an example of an OCR condition setting window displayed on the display section of the operation panel 8 at a time when the OCR conditions is to be set. Moreover, FIG. 21(b) illustrates the conditions that are selectable in each of the selection items on the display screen of FIG. 21(a). As illustrated in FIG. 21(a), in the present embodiment, the "character size", "linage", and "character type" can be set per OCR region. As the "character size", one of "standard", "large", "very large", and "auto" may be selected as illustrated in FIG. 21(b), as with the scanning mode described earlier. As the "linage", any one of "one", "plural", and "auto" may be selected, as illustrated in FIG. 21(b). Moreover, as the "character type", any one or a combination of "Japanese", "English", "numerals", "alphabetical letters/symbols", and "Katakana" may be selected.

When the user touches a part (e.g. triangular symbol) on the entry region in the display screen in FIG. 21(a) for selecting an item number, the list of item numbers illustrated in FIG. 21(b) shows up on the display section of the operation panel 8. This list is displayed by having the background regions of item numbers which already store the OCR conditions (item numbers 1 and 2 in the example of FIG. 21(*b*)) in a color different from the background regions of the item numbers whose OCR conditions are yet to be stored (item numbers 3 to 6 in the example of FIG. 21(*b*)). This thus allows the user to select a preferable number from among the vacant item numbers in a case where the item is to be newly stored, and to select the item number of the item that the user wants to edit its OCR condition from among the occupied item numbers in a case where an editing process is to be carried out to a stored item.

In the case of a vacant item number, the item name is an item name set by default (in the present embodiment, is an item name combining the item number after the text string "item"; e.g. "item 1", "item 2"). Moreover, the item names of the occupied item numbers may be edited any time by the user through operation of the operation panel 8.

Moreover, an initial (default) display in FIG. 21(*a*) for an OCR region in which no condition is stored has a blank item number (nothing is selected). Alternatively, the ledger sheet number 1 may be selected, or a smallest ledger sheet number from among the vacant ledger sheet numbers may be selected.

After the item number is selected, the user selects the "character size", the "linage", and the "character type". Thereafter, upon operation of the "set" button displayed on the OCR condition setting window by the user, the control section 7 fixes the OCR conditions set in the OCR condition setting window at that point in time as the OCR conditions of the OCR region to be set, and displays the document image as illustrated in FIG. 17(*c*) and displays the block of the OCR region on the document image in the color which indicates that the OCR condition is set.

Moreover, in a case where the "cancel" button is operated, the control section 7 does not employ the OCR condition displayed in the OCR condition setting window, and returns to what was displayed on the display section of the operation panel 8 before this OCR condition setting window was displayed.

If the "clear" button is operated, the control section 7 excludes the OCR region that is being currently edited from the OCR regions, and returns to the display screen which was displayed before the OCR region was selected (e.g. display screen illustrated in FIG. 17(*a*)).

FIG. 21(*c*) illustrates an example of an OCR condition setting window (OCR condition editing screen) in a case where an occupied item number 1 is selected. This example illustrates the OCR conditions of the region a4 (region corresponding to "Invoice Number" in the region surrounded by the border) illustrated in FIG. 18. The item name is set as "number", the character size is set as "standard", the linage is set as "one", and the character type is set as "numerals"+"alphabetical letters/symbols".

FIG. 21(*d*) illustrates an example of an OCR condition setting window (OCR condition editing screen) in a case where an occupied item 2 is selected. This example illustrates the OCR conditions of the regional illustrated in FIG. 18; the item name is set as "Address", the character size is set as "standard", the linage is set as "plural", and the character type is set as "Japanese".

As such, by designating whether the linage is "one" or "plural", it is possible to omit the layout analysis process in the processes of the ledger sheet OCR mode in a case where the linage is set as "one". Furthermore, by performing the character recognition process in accordance with the linage, it is possible to improve the character recognition accuracy. Moreover, it is further possible to improve the character recognition accuracy in performing the ledger sheet OCR mode, by designating the "character type" to perform the character recognition process in accordance with the "character type".

Thereafter, the control section 7 determines whether the setting process of the OCR region and the OCR conditions of the ledger sheet document to which the new storing process or editing process is performed is completed (S29). For example, in a case where the "store" button is operated in any one of the display screens of FIG. 17(*a*) to FIG. 17(*c*), the control section 7 determines that all the setting processes have been completed. If it is determined that the setting process is not completed, the control section 7 returns to the process of S26.

On the other hand, if it is determined that the process is completed, the control section 7 stores the ledger sheet number, the ledger sheet name, the ledger sheet type, the OCR region, and the OCR conditions, each related to the ledger sheet, in the storage section 6 (S30). Thereafter, the process is terminated.

FIG. 22 is a view illustrating an example of stored information of one ledger sheet. As illustrated in FIG. 22, "ledger sheet common" information and one or a plurality of "item" information are stored for each ledger sheet.

The "ledger sheet common" information is information (items) common for the entire ledger sheet, and includes the ledger sheet number, the ledger sheet name, the ledger sheet type, the reading resolution, whether or not the document skew correction is performed, whether or not the top-bottom direction correction is performed, and the number of items.

The ledger sheet type is text data indicative of a result of performing the character recognition process based on the image in which a predetermined position b1 of the ledger sheet document is read in the processes of S24 and S25.

The reading resolution, whether or not the document skew correction is performed, and whether or not the top-bottom direction correction is performed are reading conditions designated by the user in S23. These conditions are changeable by the user every time the reading process of the ledger sheet is performed in the ledger sheet OCR mode.

The number of items is the number of items that is set in the process of S28. As illustrated in FIG. 22, in the present embodiment, position information (upper-left X coordinate, upper-left Y coordinate, width, and height, in the example of FIG. 22) of the OCR region to which the items are applied is to be stored for each item.

(1-4-3. Processes Performed in Ledger Sheet OCR Mode)

Next describes a procedure of processes performed in the ledger sheet OCR mode. In the ledger sheet OCR mode, a ledger sheet document is read to obtain image data, an image of a region corresponding to an OCR region stored in advance is extracted from the image data, and the character recognition process is performed to this image in accordance with OCR conditions stored in advance. At this time, if the OCR region includes a character size other than "standard", the character recognition process is to be performed based on a result of performing a reduction process so that the character size of the image data fits within the "standard" size. Moreover, in the ledger sheet OCR mode, an output file including text data of a CSV (Comma Separated Values) format (text format punctuated with commas) is created based on the result of the character recognition process and is outputted, instead of creating an image file in which text data created by the character recognition process is associated with image data. Moreover, in a case where a plurality of identical ledger sheet documents are continuously read, text data in the CSV format in which a line feed code is inserted between document pages is created and is outputted. The text data of the CSV format may include an item name in the first line and an actual character recognition result in the second and subsequent lines.

If the continuously read ledger sheet documents all have an identical format, one piece of text data in the CSV format is created, whereas if the continuously read ledger sheet documents are of different formats, text data in the CSV format is created per ledger sheet format. For instance, in a case where the first page is a ledger sheet A, the second page is a ledger sheet B, and the third page is the ledger sheet A, the first page and the third page results to create one piece of text data in the CSV format, and the second page results to create another one piece of text data in the CSV format. Determination of whether or not the ledger sheet documents are identical or different in format is determined based on the ledger sheet number written on the ledger sheet.

As illustrated in FIG. 8(a), when the ledger sheet OCR mode is selected, the display section of the operation panel 8 displays the ledger sheet name, a display allowing for the user to select whether or not to perform the document skew correction and whether or not to perform the top-bottom direction correction, and a "read document" button for instructing the start of reading the document.

As illustrated in FIG. 8(b), the ledger sheet name is selectable from the following names: auto, ledger sheet number 1 (1: ledger sheet 1), ledger sheet number 2 (2: ledger sheet 2), ledger sheet number 3 (3: ledger sheet 3), ledger sheet number 4 (4: ledger sheet 4), and on.

When the ledger sheet name is selected on the display screen of FIG. 8(a), stored information related to whether or not to perform document skew correction and related to whether or not to perform top-bottom direction correction may be read out from the stored information of ledger sheets corresponding to the selected ledger sheet name, and the display state of whether or not to perform the document skew correction and the top-bottom direction correction on the display screen illustrated in FIG. 8(a) may be changed in accordance with these stored information. For instance, if the stored information of the selected ledger sheet is set as not requiring (not performing) the document skew correction, the entry item related to whether or not the document skew correction is performed in FIG. 8(a) may be changed to "not performed".

Figure 23:
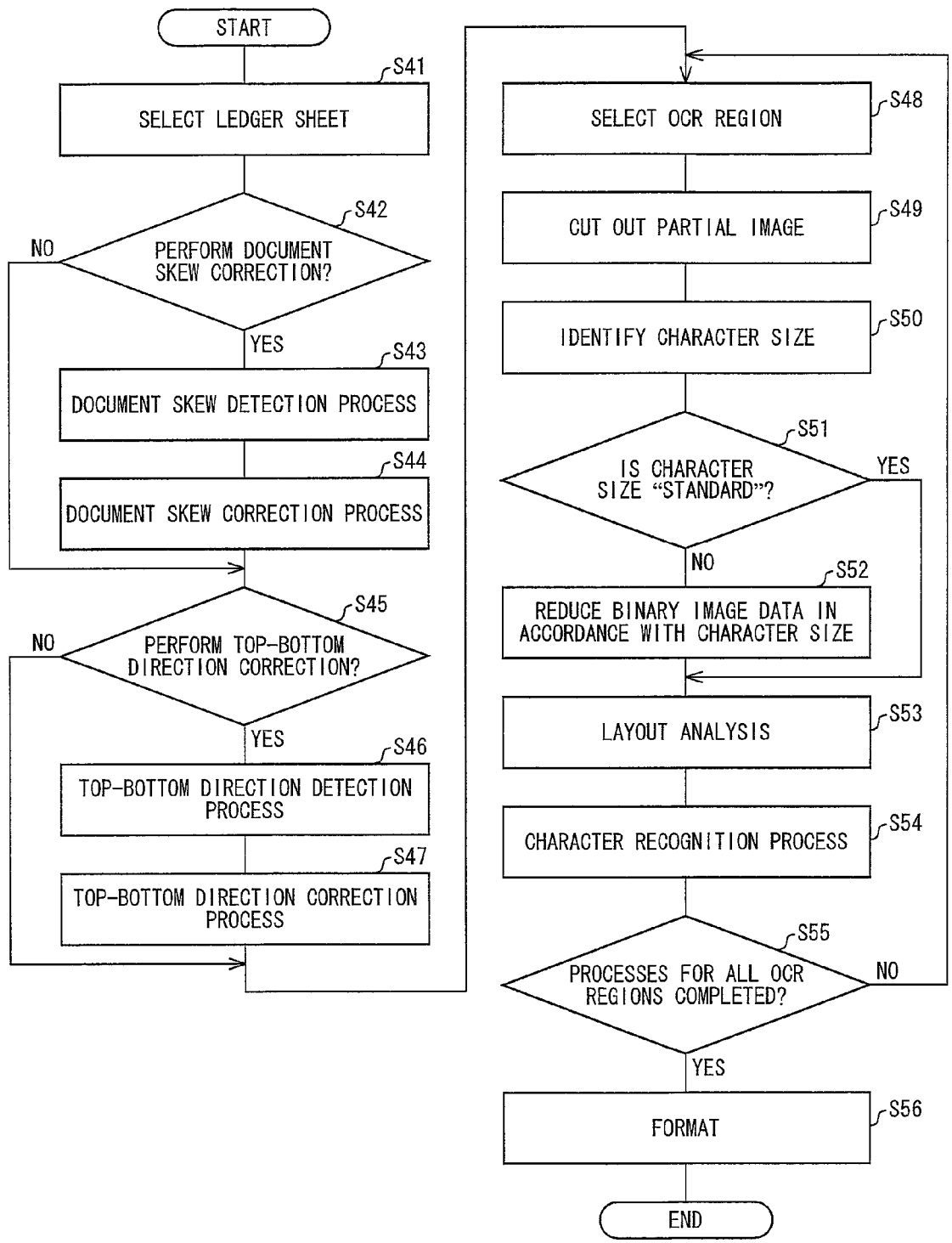
FIG. 23 is a flow chart illustrating a procedure followed in a ledger sheet OCR mode by an image processing apparatus according to an embodiment of the present invention.

FIG. 23 illustrates a flow chart of processes performed in the ledger sheet OCR mode by the image processing apparatus 3.

After each of the items are set in the display screen of FIG. 8(a) and the "read document" button is selected, the control section 7 controls the image input apparatus 2, the A/D conversion section 11, the shading correction section 12, and the input processing section 13 to perform processes similarly performed in the image forming mode described earlier.

Once the process by the input processing section 13 is completed, the control section 7 identifies, based on the ledger sheet number selected in the display screen illustrated in FIG. 8(a), a ledger sheet (stored information of the ledger sheet) to be applied in the ledger sheet OCR process (S41).

If the "auto" is selected as the ledger sheet number in the display screen illustrated in FIG. 8(a), the control section 7 reads out a ledger sheet type by performing the character recognition process for a predetermined position b1 (region corresponding to "ledger sheet type") in the image data. The ledger sheet number read out from the image data is then compared with the ledger sheet numbers of the stored ledger sheets. If an identical ledger sheet is found, that ledger sheet is identified as the ledger sheet to be applied in the ledger sheet OCR process. Whether or not the document skew correction is to be performed and whether or not the top-bottom direction correction is to be performed at the time when reading out the ledger sheet number from the image data may be set by default as a common setting regardless of ledger sheets, and may be set according to the setting details in the display screen illustrated in FIG. 8(a) when the auto is selected and the "read document" button is operated.

Moreover, the control section 7 determines whether or not to perform the document skew correction (S42). This determination is sufficiently carried out depending on whether or not the user selects to perform the document skew correction in the display screen illustrated in FIG. 8(a).

In the case where it is determined in S42 that the document skew correction is to be performed, the control section 7 controls the signal conversion section 31, the resolution conversion section 32, and the binarization processing section 33 to perform the processes described earlier to the image data to which the foregoing processes are carried out by the input processing section 13. Based on this result, the control section causes the document skew detection section 34 to perform the document skew detection process (S43), and causes the document correction section 15 to perform the document skew correction process (S44). The document correction section 15 temporarily stores the image data which has been subjected to the document skew correction in the storage section 6.

In the case where it is determined in S42 that the document skew correction is not to be performed, or alternatively, after the document skew correction process is performed in S44, the control section 7 determines whether or not to perform the top-bottom direction correction (S45). This determination is sufficiently made depending on whether the user has selected on the display screen illustrated in FIG. 8(a) to perform the top-bottom direction correction.

If it is determined in S45 to perform the top-bottom direction correction, the control section 7 reads out from the storage section 6 the image data which has been subjected to the document skew correction process in S44 or the image data which has been subjected to the processes described earlier by the input processing section 13, and causes the signal conversion section 31, the resolution conversion section 32, and the binarization processing section 33 to perform the processes described above. Thereafter, the control section 7 causes the top-bottom direction detection section 35 to perform the top-bottom direction detection process (S46), and causes the document correction section 15 to perform the top-bottom direction correction process (S47). The document correction section 15 temporarily stores in the storage section 6 the image data which has been subjected to the top-bottom direction correction process.

If it is determined in S45 so as not to perform the top-bottom direction correction, or alternatively, after the top-bottom direction correction process is performed in S47, the control section 7 extracts one or a plurality of OCR regions based on the stored information of the ledger sheet selected in S41, and selects one OCR region which has not been subjected to the character recognition process from among the extracted OCR regions (S48).

The control section 7 then reads out from the storage section 6 the image data (the image data to which the document skew correction process and/or the top-bottom direction correction process is performed, or the image data to which the processes described earlier are performed by the input processing section 13), and extracts from this image data a piece of image data (partial image data) of the OCR region selected in S48. Thereafter, to this extracted piece of image data, the control section 7 causes the signal conversion section 31, the resolution conversion section 32, and the binarization processing section 33 to perform relative processes described above and outputs the piece of image data to the document detection section 14 (S49). For example, if the OCR region in the stored information of the ledger sheet is set as illustrated in FIG. 18, and the ledger sheet document is a document as illustrated in FIG. 24(a), a partial image data corresponding to the OCR region to be processed is to be extracted from among the partial image data illustrated in FIG. 24(b). A partial image extraction section (not illustrated) which performs the process of extracting the partial image data of the OCR region may be provided separately to the control section 7.

Moreover, the control section 7 identifies which of "standard (standard size range not more than a predetermined size)", "large (first size range larger than the predetermined size)" and "very large (second size range larger than the predetermined size)" the character size of the document belongs to (S50). More specifically, the control section 7 identifies the character size in accordance with the OCR condition information stored corresponding to the OCR region extracted. Moreover, if the "auto" is stored as the OCR condition, the control section 7 causes the character size determination section 37 provided in the document detection section 14 to perform a character size automatic determination process (process of determining which one of "standard", "large", and "very large" the character size belongs to), and identifies the character size in accordance with the determination result. The method described earlier may be used as the automatic determination method of the character size.

Subsequently, the control section 7 determines whether or not the character size is "standard" based on the character size identified in S5, that is, whether or not the character size of the document is of a value not more than an upper limit of the operation specification of the recognition processing section 22 by which a predetermined character recognition accuracy is obtainable in the character recognition performed by the recognition processing section 22 (S51). In the case where the character size is determined as "standard", the process proceeds to a process of S53 later described.

On the other hand, if it is determined that the character size is not "standard", that is, if the identified character size is "large" or "very large", the control section 7 controls the reduction processing section 38 to perform a reduction process to the binary image data of the first resolution and of the second resolution that is created by the binarization processing section 33 (binary image data created based on the partial image data extracted in S49) in accordance with the identified character size, so that a character size in the image data which has been subjected to the reduction fits within the "standard" size (S52). Thereafter, the binary image data of the second resolution which has been subjected to the reduction process is outputted to the layout analysis section 36, and the binary image data of the first resolution which has been subjected to the reduction process is outputted to the recognition processing section 22. More specifically, a separate reduction ratio for reducing a character determined as belonging to the size range of "large" or "very large" is set in advance for each of those size ranges, and the reduction process is performed with the reduction ratio corresponding to the size range that the character belongs to. For instance, if the character size is "large", the image size is reduced by half of the original size, and if the character size is "very large", the image size is reduced to a quarter of the original size.

The control section 7 next controls the layout analysis section 36 to perform a layout analysis process of analyzing whether the direction of the character included in the image data is written vertically or horizontally, based on the binary image data of the second resolution received from the reduction processing section 38 (S53).

Thereafter, the control section 7 controls the recognition processing section 22 to perform the character recognition process to the image data based on (i) the binary image data of the first resolution received from the reduction processing section 38, (ii) a layout analysis result (whether the character is written vertically or horizontally) received from the layout analysis section 36, and (iii) the OCR conditions of the OCR region in process, which is included in the stored information of the ledger sheet selected in S41, and to output a result of the character recognition process to the drawing command generation section 23 (S54). The present embodiment does not create in the ledger sheet OCR mode an image file in which text data is associated with image data; the drawing command generation section 23 outputs the received character recognition process result to the formatting processing section 24 as it is.

Subsequently, the control section 7 determines whether or not the character recognition process has been performed to all of the OCR regions included in the stored information of the ledger sheet selected in S41 (S55). In a case where there is a remaining OCR region which has not been subjected to the character recognition process yet, the process returns to the process of S48.

On the other hand, if it is determined that the character recognition process has been performed for all of the OCR regions, the control section 7 controls the formatting processing section 24 to create text data of the CSV format based on a character recognition process result received from the drawing command generation section 23 (S56). This text data is transmitted to a predetermined destination by the communication apparatus 5, and thereafter the process is terminated.

The image data of the ledger sheet document may also be transmitted together with the text data. In this case, the image data outputted from the halftone generation section 20 is converted into a predetermined output format by the formatting processing section 24, and is transmitted to the predetermined transmission destination by the communication apparatus 5.

Moreover, it may be the case that no image data is outputted and just the text data is outputted. In this case, the processes performed by the color correction section 16, the black generation and under color removal section 17, the spatial filter section 18, the output tone correction section 19, the halftone generation section 20, and the segmentation processing section 21 may be omitted.

As described above, in performing the character recognition process of image data, if the character size of a text string to which the character recognition process is to be performed is larger than an upper limit value (upper limit size) of an operation specification of the recognition processing section 22 by which a predetermined character recognition accuracy is obtained, a digital color multifunction peripheral 1 according to the present embodiment performs the character recognition process based on image data obtained by performing a reduction process to the image data so that the character size of the text string is not more than the upper limit value.

This as a result allows for carrying out the character recognition process with good accuracy even for characters larger than the upper limit value. Moreover, the image input apparatus 2 is capable of performing an image reading process with use of a common photoelectric conversion means regardless of the character size. Hence, it is possible to perform a character recognition process of high accuracy in a simple configuration, without having a complicated apparatus configuration of the image input apparatus 2.

Moreover, in the present embodiment, a separate reduction ratio for reducing characters determined as belonging to one of either size ranges of "large" or "very large" (any one of a plurality of size ranges larger than the predetermined size) to a size not more than the predetermined size is set in advance for each of those size ranges. This allows for performing the reduction process with a reduction ratio set in advance, thereby omitting the necessity to calculate the reduction ratio in accordance with the size of the characters. This makes it easy to perform the reduction process.

The present embodiment describes a case where the present invention is applied to the digital color multifunction peripheral 1. However, to what the present invention is applied is not limited to the digital color multifunction peripheral 1. For instance, the present invention may also be applied to an apparatus (e.g. copying machine, scanner) which includes just a part of the foregoing functions (copier function, scanner function, printer function, facsimile transmitting and receiving function, scan to e-mail function) that the digital color multifunction peripheral 1 has. Moreover, the present invention is applicable to an image processing apparatus (e.g. image processing apparatus provided in a personal computer, server apparatus or the like) to which a character recognition process is performed to image data obtained from outside.

Figure 25:
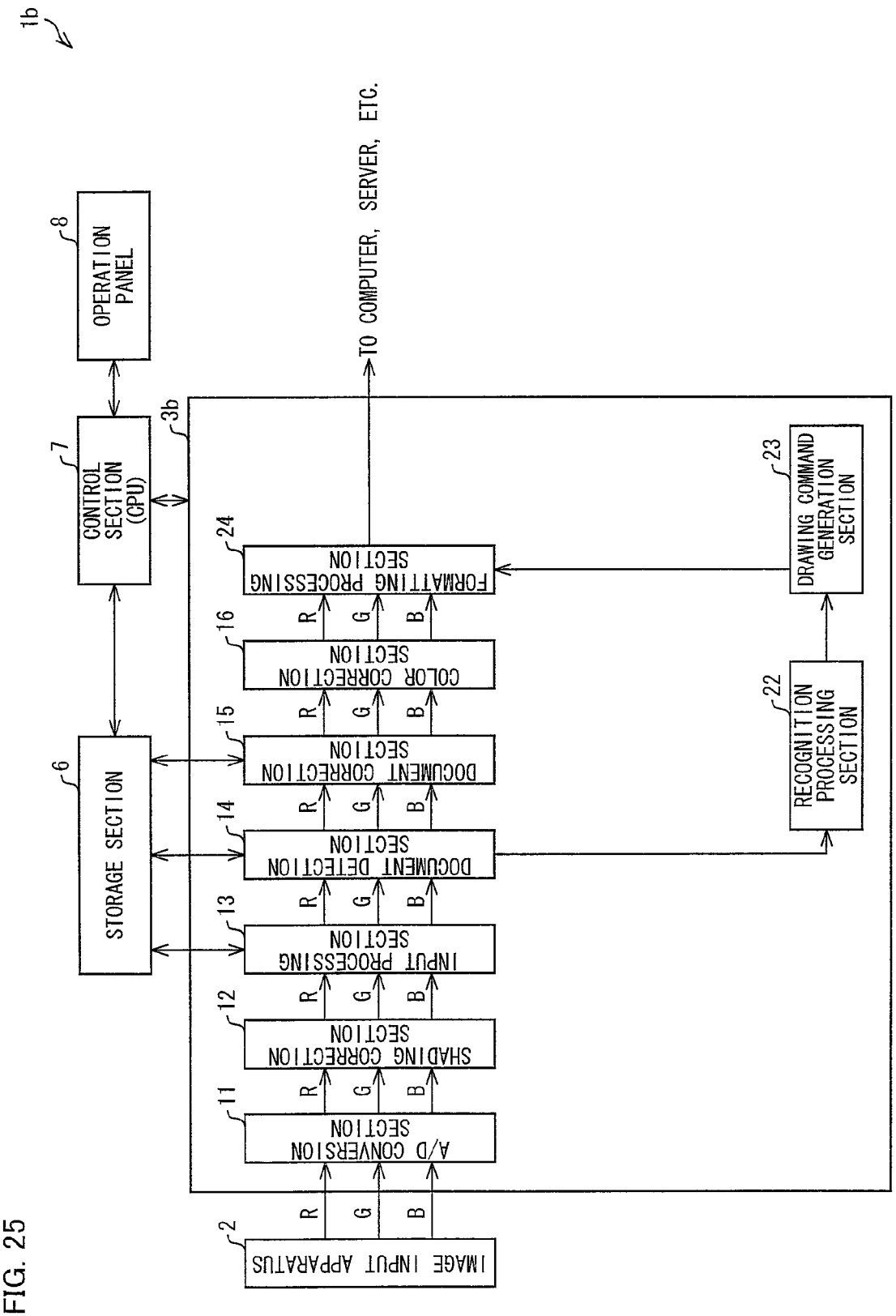
FIG. 25 is a block diagram illustrating an example of a configuration of an image reading apparatus including an image processing apparatus according to an embodiment of the present invention.

FIG. 25 is a block diagram illustrating a configuration example of a case where the present invention is applied to a color scanner (image reading apparatus) 1b. Members having a similar function as the members provided in the digital color multifunction peripheral 1 are provided with identical reference signs.

As illustrated in FIG. 25, the color scanner 1b includes an image input apparatus 2, an image processing apparatus 3b, a storage section 6, a control section 7, and an operation panel 8. Moreover, the image processing apparatus 3b includes an A/D conversion section 11, a shading correction section 12, an input processing section 13, a document detection section 14, a document correction section 15, a color correction section 16, a recognition processing section 22, a drawing command generation section 23, and a formatting processing section 24. Accordingly, the color scanner 1b performs identical processes as those in the image transmission mode of the digital color multifunction peripheral 1. Note that image files converted into a predetermined format in the formatting processing section 24 may be outputted to for example a computer or a server.

Figure 26:
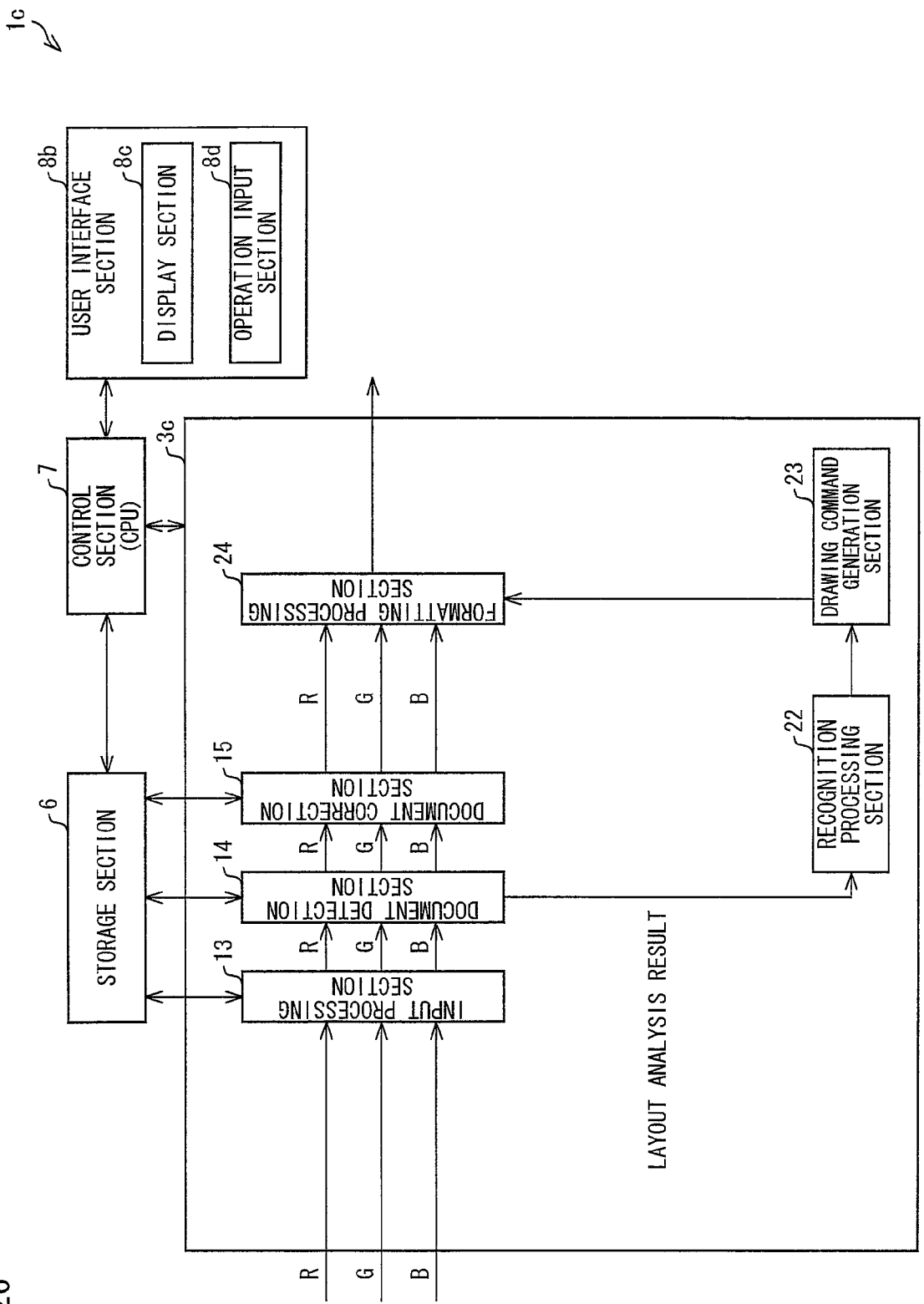
FIG. 26 is a block diagram illustrating an example of a configuration of an information processing apparatus including an image processing apparatus according to an embodiment of the present invention.

FIG. 26 is a block diagram illustrating a configuration example of a case where the present invention is applied to an information processing apparatus 1c such as a personal computer or a server apparatus. Members having similar functions as those provided in the digital color multifunction peripheral 1 are provided with identical reference signs.

As illustrated in FIG. 26, the information processing apparatus 1c includes an image processing apparatus 3c, a storage section 6, a control section 7, and a user interface section 8b. Moreover, the image processing apparatus 3c includes an input processing section 13, a document detection section 14, a document correction section 15, a recognition processing section 22, a drawing command generation section 23, and a formatting processing section 24. The user interface section 8b performs processes similarly to the operation panel 8 of the digital color multifunction peripheral 1, and includes the display section 8c and an operation input section 8d. As the display section 8c, a liquid crystal display device or like device may be used. Moreover, as the operation input section 8d, a keyboard, a mouse, or the like may be used.

According to the configuration, the information processing apparatus 1c performs processes similarly to the character recognition process of the digital color multifunction peripheral 1. Moreover, an image file converted into a predetermined format by the formatting processing section 24 is either stored in the storage section 6 or is outputted to another apparatus.

Moreover, in the present embodiment, each of sections (blocks) provided in the digital color multifunction peripheral 1, the color scanner 1b, and the information processing apparatus 1c may be realized by software using a processor such as a CPU or the like. In this case, the digital color multifunction peripheral 1, the color scanner 1b, and the information processing apparatus 1c each include a CPU (central processing unit) and memory devices (memory media). The CPU (central processing unit) executes instructions in control programs realizing the functions. The memory devices include a ROM (read only memory) which contains the programs, a RAM (random access memory) to which the programs are loaded, and a memory containing the programs and various data. The objective of the present invention can also be achieved by mounting to the digital color multifunction peripheral 1, the color scanner 1b, and the information processing apparatus 1c a computer-readable storage medium containing control program code (executable program, intermediate code program, or source program) for the digital color multifunction peripheral 1, the color scanner 1b, and the information processing apparatus 1c, which is software realizing the aforementioned functions, in order for the computer (or CPU, MPU (Micro Processing Unit)) to retrieve and execute the program code contained in the storage medium.

The storage medium may be, for example, a tape, such as a magnetic tape or a cassette tape; a magnetic disk, such as a Floppy® disk or a hard disk, or an optical disk, such as CD-ROM/MO/MD/DVD/CD-R; a card, such as an IC card (memory card) or an optical card; or a semiconductor memory, such as a mask ROM/EPROM/EEPROM/flash ROM.

The digital color multifunction peripheral 1, the color scanner 1b, and the information processing apparatus 1c may be arranged to be connectable to a communications network so that the program code may be delivered over the communications network. The communications network is not limited in any particular manner, and may be, for example, the Internet, an intranet, extranet, LAN, ISDN, VAN, CATV communications network, virtual dedicated network (virtual private network), telephone line network, mobile communications network, or satellite communications network. The transfer medium which makes up the communications network is not limited in any particular manner, and may be, for example, wired line, such as IEEE 1394, USB, electric power line, cable TV line, telephone line, or ADSL line; or wireless, such as infrared radiation (IrDA, remote control), Bluetooth, 802.11 wireless, HDR, mobile telephone network, satellite line, or terrestrial digital network.

Moreover, each of the blocks of the digital color multifunction peripheral 1, the color scanner 1b, and the information processing apparatus 1c is not particularly limited to ones which are realized by software, and may be realized by way of hardware, or may be ones which combine hardware performing a part of the processes with operation means for executing software which carries out control of the hardware and performs remaining processes.

As described above, an image processing apparatus according to the present embodiment is an image processing apparatus performing a character recognition process of characters written on a document, the character recognition process being performed based on image data obtained by reading the document, the image processing apparatus including: a character size determination section configured to determine to which one of size ranges a character size of the characters in the image data to be subjected to the character recognition process belongs, the size ranges including a standard size range not more than a predetermined size and a plurality of size ranges larger than the predetermined size; a reduction processing section configured to, in a case where the character size determination section determines that the character size of the characters to be subjected to the character recognition process in the image data belongs to one of the plurality of size ranges larger than the predetermined size, reduce a region at least including the characters determined as belonging to the size range larger than the predetermined size, so that the character size becomes not more than the predetermined size, the character size being reduced by use of a reduction ratio corresponding to the character size of the determined size range, each of the size ranges being set in advance with a reduction ratio used for reducing the character size of the characters belonging to the respective size range; and a recognition processing section configured to perform the character recognition process of the characters included in the image data, in the case where the character size determination section determines that the character size of the characters to be subjected to the character recognition process in the image data belongs to one of the plurality of size ranges larger than the predetermined size, the recognition processing section performing the character recognition process with use of the image data in which the region including the characters determined as belonging to one of the plurality of size ranges larger than the predetermined size is reduced by the reduction processing section.

Moreover, an image processing method according to the present embodiment is an image processing method of performing a character recognition process of characters written on a document, the character recognition process being performed based on image data obtained by reading the document, the method including the steps of: (i) determining to which one of size ranges a character size of the characters in the image data to be subjected to the character recognition process belongs, the size ranges including a standard size range not more than a predetermined size and a plurality of size ranges larger than the predetermined size; (ii) in a case where it is determined in the step (i) that the character size of the characters to be subjected to the character recognition process in the image data belongs to one of the plurality of size ranges larger than the predetermined size, reducing a region at least including the characters determined as belonging to a size range larger than the predetermined size, so that the character size becomes not more than the predetermined size, the character size being reduced by use of a reduction ratio corresponding to the character size of the determined size range, each of the size ranges being set in advance with a reduction ratio used for reducing the character size of the characters belonging to the respective size range; and (iii) performing a character recognition process of the characters included in the image data; in the case where the character size of the characters to be subjected to the character recognition process in the image data is determined in the step (i) as belonging to one of the plurality of size ranges larger than the predetermined size, the character recognition process being performed with use of the image data in which the region including the characters determined as belonging to one of the plurality of size ranges larger than the predetermined size is reduced in the step (ii).

According to the image processing apparatus and the image processing method of the present invention, characters in the image data which are to be subjected to the character recognition process are determined as to which size range a character size of the characters belongs, which size ranges include a standard size range not more than a predetermined size and a plurality of size ranges larger than the predetermined size; in a case where it is determined that the characters belong to one of the plurality of size ranges larger than the predetermined size, the image processing apparatus and the image processing method perform a reducing process to a region at least including the characters determined as belonging to a size range larger than the predetermined size, so that the character size becomes not more than the predetermined size, the character size being reduced by use of a reduction ratio corresponding to the character size of the determined size range, each of the size ranges being set in advance with a reduction ratio used for reducing the character size of the characters belonging to the respective size range, and performs the character recognition process of the characters by use of the image data which has been subjected to the reducing process. This allows for carrying out the character recognition process with good accuracy even if the character recognition process is performed to characters having a character size larger than the predetermined size. Namely, it is possible to perform the character recognition process for characters of various character sizes with a simple configuration. Moreover, the reduction process is performed with use of a reduction ratio set beforehand. Hence, there is no need to calculate the reduction ratio in accordance with the size of the character. This makes it possible to perform the reducing process in a simple manner.

Moreover, the image processing apparatus may be configured in such a manner that the predetermined size is set as a value equal to or smaller than an upper limit value of the recognition processing section, the upper limit value being set in terms of a specification allowing for the recognition processing section to obtain a predetermined character recognition accuracy.

According to the configuration, it is possible to achieve a predetermined character recognition accuracy even if the size of the character to which the character recognition process is to be performed is larger than an upper limit in terms of the specification of the recognition processing section to achieve a predetermined character recognition accuracy in the recognition processing section.

Moreover, the character size determination section may be configured to determine the character size of each region in the image data or each line in the image data.

According to the configuration, by determining the character size of each region in the image data or each line in the image data, it is possible to perform the character recognition process accurately even if the character size differs in each region or line.

Moreover, the image processing apparatus may be configured so as to further include: an operation input section configured to receive a selection instruction of a character size from a user, the character size determination section determining, based on the selection instruction received from the operation input section, to which one of size ranges the character size of the characters in the image data to be subjected to the character recognition process belongs, the size ranges including the standard size range not more than a predetermined size and the plurality of size ranges larger than the predetermined size.

According to the configuration, it is possible to determine whether or not the size of the characters in the image data to which the character recognition process is processed is larger than the predetermined size, based on a selection instruction from the user. As a result, determination of the character size is easily carried out.

Moreover, the image processing apparatus may be configured in such a manner that the character size determination section detects, based on the image data, (a) a bound box of each character, (b) a height of each character, (c) a height of each line, or (d) a bound box of a character group including a plurality of characters, each in the region in which the characters to be subjected to the character recognition process are included, and determines based on the above detecting result, to which one of size ranges the character size of the characters in the image data to be subjected to the character recognition process belongs, the size ranges including the standard size range not more than a predetermined size and the plurality of size ranges larger than the predetermined size.

According to the configuration, the character size determination section automatically determines whether or not the size of the characters in the image data to which the character recognition process is performed is larger than a predetermined size. Hence, it is possible to improve convenience for the user.

Moreover, the image processing apparatus may be configured so as to further include a formatting processing section configured to create an output file including text data created in accordance with a result of the character recognition process. The output file may be a file made of just text data, or may be a file in which image data is associated with text data.

An image reading apparatus of the present invention includes: an image input apparatus configured to read a document to obtain image data; and any one of the foregoing image processing apparatuses configured to perform the character recognition process of characters written on the document based on the image data obtained by the image input apparatus.

According to the configuration, even if the character recognition process is performed to a character of a character size larger than the predetermined size, it is possible to perform the character recognition process accurately. The character recognition process is performed to the image data obtained by the image input apparatus upon reducing its resolution if necessary. As a result, there is no need to provide a plurality of photoelectric conversion means as like the technique disclosed in Patent Literature 1. Accordingly, it is possible to accurately perform a character recognition process of characters of various character sizes without causing the apparatus configuration to become complex or causing an increase in apparatus costs.

An image forming apparatus of the present invention includes: the image processing apparatus including the formatting processing section; an image forming section configured to form on a recording material an image in accordance with the image data; and a file output processing section configured to transmit the output file to a predetermined transmitting destination or to store the output file in a predetermined storage destination.

According to the configuration, it is possible to accurately perform the character recognition process of characters of various character sizes with a simple configuration, and either transmit an output file including text data corresponding to a result of the character recognition process to a predetermined transmitting destination or store the output file in a predetermined storage destination.

The image processing apparatus may be accomplished by a computer. In this case, by having the computer be caused to function as each of the sections, a program causing the computer to operate as the image processing apparatus and a computer-readable recording medium recording the program are also included in the scope of the present invention.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

INDUSTRIAL APPLICABILITY

The present invention is applicable to an image processing apparatus and an image processing method, each of which performs a character recognition process of characters written on a document that is read to obtain image data, which character recognition process is performed based on that obtained image data.

REFERENCE SIGNS LIST

1 digital color multifunction peripheral (image reading apparatus, image forming apparatus)
1b color scanner (image scanning apparatus)
1c information processing apparatus
2 image input apparatus
3, 3b, 3c image processing apparatus
4 image output apparatus (image forming section)
5 communication apparatus (file output processing section)
6 storage section
7 control section
8 operation panel (operation input section)
8b user interface section (operation input section)
14 document detection section
15 document correction section
22 recognition processing section
23 drawing command generation section
24 formatting processing section
25 automatic document type discrimination section
31 signal conversion section
32 resolution conversion section
33 binarization processing section
34 document skew detection section
35 top-bottom direction detection section
36 layout analysis section
37 character size determination section
38 reduction processing section
39 linage determination section

The invention claimed is:

1. An image processing apparatus performing a character recognition process of characters written on a document, the character recognition process being performed based on image data obtained by reading the document, the image processing apparatus comprising:

a character size determination section configured to (i) determine whether or not a character size of the characters in the image data to be subjected to the character recognition process is larger than a predetermined size and (ii), in a case where the character size is determined as being larger than the predetermined size, classify the character size as one of a plurality of predetermined levels, each of the predetermined levels being larger than the predetermined size;

a reduction processing section configured to, in a case where the character size of the characters to be subjected to the character recognition process in the image data is classified as one of the plurality of predetermined levels by the character size determination section, reduce a region of the image data corresponding to a portion of the document and including the characters whose character size is classified as one of the plurality of predetermined levels, so that the character size becomes not more than the predetermined size, the character size being reduced by use of a corresponding one of reduction ratios which are set in advance with the respective plurality of predetermined levels, whereas another region of the image data corresponding to another portion of the document, in a case where the character size of characters in the another region to be subjected to the character recognition process in the image data is not larger than the predetermined size, is not reduced; and a recognition processing section configured to perform the character recognition process of the characters included in the image data, in the case where the character size of the characters to be subjected to the character recognition process in the image data is classified as one of the plurality of predetermined levels by the character size determination section, the recognition processing section performing the character recognition process with use of the image data in which the region of the image data including the characters whose character size is classified as one of the plurality of predetermined levels is reduced by the reduction processing section.

2. The image processing apparatus according to claim 1, wherein the predetermined size is set as a value equal to or smaller than an upper limit value of the recognition processing section, the upper limit value being set in terms of a specification allowing for the recognition processing section to obtain a predetermined character recognition accuracy.

3. The image processing apparatus according to claim 1, wherein the character size determination section determines the character size of each region in the image data or each line in the image data.

4. The image processing apparatus according to claim 1, further comprising:

an operation input section configured to receive a selection instruction of a character size from a user, the character size determination section classifies, based on the selection instruction received from the operation input section, to which one of the plurality of predetermined levels the character size of the characters in the image data to be subjected to the character recognition process belongs.

5. The image processing apparatus according to claim 1, wherein the character size determination section detects, based on the image data, (a) a bound box of each character, (b) a height of each character, (c) a height of each line, or (d) a bound box of a character group including a plurality of characters, each in the region of the image data in which the characters to be subjected to the character recognition process are included, and classifies based on the above detecting result, to which one of the plurality of predetermined levels the character size of the characters in the image data to be subjected to the character recognition process belongs.

6. The image processing apparatus according to claim 1, further comprising:

a formatting processing section configured to create an output file including text data created in accordance with a result of the character recognition process.

7. An image reading apparatus comprising:

an image input apparatus configured to read a document to obtain image data; and an image processing apparatus as set forth in claim 1, configured to perform the character recognition process of characters written on the document based on the image data obtained by the image input apparatus.

8. An image forming apparatus comprising:

an image processing apparatus as set forth in claim 6;

an image forming section configured to form on a recording material an image in accordance with the image data; and a file output processing section configured to transmit the output file to a predetermined transmitting destination or to store the output file in a predetermined storage destination.

9. An image processing method of performing a character recognition process of characters written on a document, the character recognition process being performed based on image data obtained by reading the document, the method comprising the steps of:

(i) determining whether or not a character size of the characters in the image data to be subjected to the character recognition process is larger than a predetermined size;

(ii) in a case where it is determined in the step (i) that the character size of the characters to be subjected to the character recognition process in the image data is larger than the predetermined size, classifying the character size as one of a plurality of predetermined levels, each of the predetermined levels larger than the predetermined size;

(iii) in a case where the character size of the characters to be subjected to the character recognition process in the image data is classified in the step (ii) as one of the plurality of predetermined levels, reducing a region of the image data corresponding to a portion of the document and including the characters whose character size is classified as one of the plurality of predetermined levels, so that the character size becomes not more than the predetermined size, the character size being reduced by use of a corresponding one of reduction ratios which are set in advance with the respective plurality of predetermined levels, whereas another region of the image data corresponding to another portion of the document, in a case where the character size of characters in the another region to be subjected to the character recognition process in the image data is not larger than the predetermined size, is not reduced; and (iv) performing a character recognition process of the characters included in the image data;

in the case where the character size of the characters to be subjected to the character recognition process in the image data is classified in the step (ii) as one of the plurality of predetermined levels, the character recognition process being performed with use of the image data in which the region including the characters whose character size is classified as one of the plurality of predetermined levels is reduced in the step (iii).

10. A non-transitory computer-readable storage medium in which a program is stored, the program is for causing a computer to function as each of the character size determination section, the reduction processing section, and the recognition processing section of an image processing apparatus as set forth in claim 1.

11. The image processing apparatus as set forth in claim 1, wherein:

the character size determination section (i) determines whether or not a character size of a plurality of characters included in each of regions of the image data is larger than the predetermined size and (ii) classifies, as one of the plurality of predetermined levels, the character size of the plurality of characters included in a corresponding one of the regions, which character size is determined as being larger than the predetermined size; and the reduction processing section reduces, in accordance with a classifying result of the character size determination section, a region including a plurality of characters whose character size is determined as being larger than the predetermined size, the region being reduced by use of a corresponding one of reduction ratios which are set in advance with the respective plurality of predetermined levels.

12. The image processing apparatus as set forth in claim 1, wherein:

the character size determination section (i) determines whether or not a character size of a plurality of characters included in each of lines of the image data is larger than the predetermined size and (ii) classifies, as one of the plurality of predetermined levels, the character size of the plurality of characters included in a corresponding one of the lines, which character size is determined as being larger than the predetermined size; and the reduction processing section reduces, in accordance with a classifying result of the character size determination section, a line including a plurality of characters whose character size is determined as being larger than the predetermined size, the line being reduced by use of a corresponding one of reduction ratios which are set in advance with the respective plurality of predetermined levels.

* * * * *